(12) United States Patent
Lyu et al.

(10) Patent No.: US 11,336,408 B2
(45) Date of Patent: May 17, 2022

(54) TRANSMISSION RESOURCE ALLOCATION METHOD AND APPARATUS, AND DATA SENDING METHOD AND APPARATUS

(71) Applicant: Huawei Technologies Co., Ltd., Shenzhen (CN)

(72) Inventors: Yongxia Lyu, Ottawa (CA); Jinhuan Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 125 days.

(21) Appl. No.: 16/673,672

(22) Filed: Nov. 4, 2019

(65) Prior Publication Data

US 2020/0083999 A1    Mar. 12, 2020

Related U.S. Application Data

(63) Continuation of application No. PCT/CN2018/085741, filed on May 5, 2018.

(30) Foreign Application Priority Data

May 5, 2017  (CN) .......................... 201710313511.2

(51) Int. Cl.
| | |
|---|---|
| *H04L 5/00* | (2006.01) |
| *H04W 72/12* | (2009.01) |
| *H04W 72/14* | (2009.01) |
| *H04W 74/08* | (2009.01) |

(52) U.S. Cl.
CPC ....... *H04L 5/0048* (2013.01); *H04W 72/1268* (2013.01); *H04W 72/14* (2013.01); *H04W 74/0833* (2013.01)

(58) Field of Classification Search
CPC .................................................. H04W 72/042
See application file for complete search history.

(56) References Cited

U.S. PATENT DOCUMENTS

| 8,027,243 B2* | 9/2011 | Jin .......................... H04L 5/023 370/206 |
| 2016/0029238 A1 | 1/2016 | Chen et al. |

(Continued)

FOREIGN PATENT DOCUMENTS

| CN | 102055712 A | 5/2011 |
| CN | 102469589 A | 5/2012 |

(Continued)

OTHER PUBLICATIONS

Intel Corporation, "Grant-free UL transmissions in NR", 3GPP TSG-RAN WG1 #86bis, R1-1609499, Lisbon, Portugal, Oct. 10-14, 2016, total 8 pages.

(Continued)

Primary Examiner — Ayanah S George
(74) Attorney, Agent, or Firm — Slater Matsil, LLP

(57) ABSTRACT

This application provides a transmission resource allocation method and apparatus, and a data sending method and apparatus. The method includes: determining, by a network device, at least one basic resource element, where each of the at least one basic resource element corresponds to at least one pilot, a first basic resource element in the at least one basic resource element corresponds to at least two pilots, and the at least two pilots are different; and indicating, by the network device to a terminal device, at least one pilot corresponding to one or more of the at least one basic resource element.

20 Claims, 8 Drawing Sheets

(56) References Cited

U.S. PATENT DOCUMENTS

| | | | | |
|---|---|---|---|---|
| 2016/0219672 | A1* | 7/2016 | Liu | H05B 45/50 |
| 2017/0338930 | A1* | 11/2017 | Lee | H04L 5/0091 |

FOREIGN PATENT DOCUMENTS

| | | | |
|---|---|---|---|
| CN | 102739593 | A | 10/2012 |
| CN | 102946296 | A | 2/2013 |
| CN | 103270715 | A | 8/2013 |
| CN | 104541472 | A | 4/2015 |
| CN | 104871589 | A | 8/2015 |
| CN | 106465354 | A | 2/2017 |
| EP | 2640140 | A1 | 9/2013 |
| EP | 3001577 | A1 | 3/2016 |
| EP | 3579650 | A1 | 12/2019 |
| WO | 2015035876 | A1 | 3/2015 |
| WO | 2015042972 | A1 | 4/2015 |

OTHER PUBLICATIONS

CMCC,"Discussion on DCI Contents for NR",3GPP TSG RAN WG1 Meeting #88bis, R1-1705104, US, Spokane Apr. 3-7, 2017, total 8 pages.

NTT Docomo et al,"Low latency uplink for URLLC",3GPP TSG RAN WG1 Meeting #88bis, R1-1705751, Spokane, USA Apr. 3-7, 2017, total 4 pages.

Huawei et al.,"WF on procedures of grant-free transmission", 3GPP TSG RAN WG1 #88bis, R1-1706495, Spokane, USA Apr. 3-7, 2017, total 6 pages.

Huawei et al., "Support of URLLC in UL", 3GPP TSG RAN WG1 NR Ad Hoc Meeting R1-1700024, Spokane, Washington, USA, Jan. 16-20, 2017, 6 pages.

Huawei, HiSilicon,"UL Grant-free transmission",3GPP TSG RAN WG1 Meeting #88 R1-1701665, Athens, Greece, Feb. 13-17, 2017,16 pages.

Huawei, HiSilicon: "WF on grant-free remaining issues", 3GPP TSG RAN WG1 Meeting #88, R1-1703718, Athens, Greece, Feb. 13-17, 2017, 3 pages.

ZTE et al., "DMRS design considerations in grant-free transmission", 3GPP TSG RAN WG1 Meeting # 88bis, R1-1704660, Spokane, USA, Apr. 3-7, 2017, 4 pages.

SamSung, "Grant free scheduling request", 3GPP TSG RAN WG1 Meeting # 88bis, R1-1705413, Spokane, Washington, USA, Apr. 3-7, 2017, 4 pages.

"On UE-Common NR-PDCCH," Agenda Item: 8.1.3.1.2, Source: Samsung, Document for: Discussion and Decision, 3GPP TSG RAN WG1 #88, R1-1702970, Feb. 13-17, 2017, 4 pages.

* cited by examiner

TRANSMISSION RESOURCE ALLOCATION METHOD AND APPARATUS, AND DATA SENDING METHOD AND APPARATUS

CROSS-REFERENCE TO RELATED APPLICATIONS

This application is a continuation of International Application No. PCT/CN2018/085741, filed on May 5, 2018, which claims priority to Chinese Patent Application No. 201710313511.2, filed on May 5, 2017. The disclosures of the aforementioned applications are hereby incorporated by reference in their entireties.

TECHNICAL FIELD

This application relates to the field of mobile communications, and in particular, to a transmission resource allocation method and apparatus, and a data sending method and apparatus.

BACKGROUND

An existing LTE uplink scheduling mechanism mainly includes two types: dynamic scheduling and semi-persistent scheduling. The semi-persistent scheduling is mainly applicable to a periodic service. To be specific, a data packet of a terminal device arrives at a period (for example, a VoIP service), and a network device reserves a time-frequency resource for the terminal device in a relatively fixed manner to send uplink data. In such a scheduling manner, scheduling signaling overheads can be reduced. A period of the semi-persistent scheduling is configured by using higher layer signaling, and activation and release of the semi-persistent scheduling are based on physical layer signaling. The dynamic scheduling is a most common uplink scheduling manner. A typical procedure of the dynamic uplink scheduling is as follows:

(1) After a data packet of a terminal device arrives, the terminal device sends a resource request to a network device. The resource request may be a dedicated scheduling request (SR) or a random access preamble sequence (PRACH).

(2) After receiving the resource request of the terminal device, the network device allocates a time-frequency resource to the terminal device, and sends an uplink scheduling instruction (UL grant) to the terminal device.

(3) After receiving the uplink scheduling instruction, the terminal device starts to perform packet assembly (code modulation), to prepare for data transmission. A data packet header may include buffer status report (BSR) of the terminal device.

(4) The network device receives an uplink data packet of the terminal device at a specified time, and performs demodulation and decoding.

It can be learned from the foregoing description that, for the terminal device for which the dynamic scheduling is used, two parts of latencies are mainly included from a time at which the data packet arrives to a time at which uplink data is sent. A first part is a latency from a time at which the terminal device sends the scheduling request to a time at which the terminal device receives the uplink scheduling instruction. A second part is a latency from the time at which the terminal device receives the uplink scheduling instruction to a time at which the terminal device sends the data. Main reasons for generating the two parts of latencies are a processing latency between the network device and the terminal device and a sending latency between air interface signals. In an existing LTE system, both the two parts of latencies are 4 ms.

A major feature of a 5G communications system, in comparison with a 4G communications system, is that support for an ultra-reliable low-latency service communications (URLLC) is added. There are a plurality of categories of URLLC services. Typical examples include industrial control, industrial production process automation, human-computer interaction, telemedicine, and the like.

There are two types of URLLC services. One type is a periodic service. Arrival of a data packet is periodic. The semi-persistent scheduling may be used for such a service. The other type is a sporadic service. The arrival of the data packet cannot be predicted. The semi-persistent scheduling is not suitable for such a service, and using the dynamic scheduling (grant based) in LTE also causes a latency to data packet transmission. In a scheduling-free instruction (grant-free) uplink transmission manner, a step of sending an uplink resource request of a terminal device and a step of sending a downlink scheduling instruction of a network device are omitted. Therefore, a processing and transmission latency at a physical layer of the data packet is reduced, and signaling overheads are reduced. Therefore, the uplink transmission manner becomes a candidate technology for URLLC uplink transmission.

A scheduling-free instruction mechanism is not completely controlled by the network device. Consequently, interference between terminal devices is easily caused, and a correctness percentage of detection is low.

SUMMARY

To resolve a problem of a low correctness percentage of detection in a scheduling-free instruction mechanism, this application describes a transmission resource allocation method and apparatus, and a data sending method and apparatus.

According to a first aspect, an embodiment of this application provides a transmission resource allocation method. The method includes: determining at least one basic resource element; determining at least one pilot configuration for each of the at least one basic resource element; indicating, to a first terminal device, at least one resource location of the at least one basic resource element and at least one pilot configuration for the at least one basic resource element.

In a possible implementation of the first aspect, the method further includes: determining one or more basic resource elements; determining at least one pilot configuration for each of the one or more basic resource elements; and indicating, to a second terminal device, one or more resource locations of the one or more basic resource elements and at least one pilot configuration for the one or more basic resource elements. The at least one basic resource element and the one or more basic resource elements each include a first basic resource element. The at least one pilot configuration for the at least one basic resource element includes at least one first pilot configuration, and the at least one first pilot configuration is determined for the first basic resource element. The at least one pilot configuration for the one or more basic resource elements includes at least one second pilot configuration, and the at least one second pilot configuration is determined for the first basic resource element. Each first pilot configuration is different from each second pilot configuration.

In a possible implementation of the first aspect, the method further includes: determining at least one resource element group, where each resource element group includes at least one resource element, and each resource element includes one or more of the at least one basic resource element. The indicating, to a first terminal device, at least one resource location of the at least one basic resource element includes: indicating, to the first terminal device, one or more resource locations of the at least one resource element group.

In a possible implementation of the first aspect, the indicating, to the first terminal device, one or more resource locations of the at least one resource element group includes: indicating, to the first terminal device, one or more resource locations of the at least one resource element in each resource element group.

In a possible implementation of the first aspect, the indicating, to the first terminal device, one or more resource locations of the at least one resource element group includes: indicating, to the first terminal device, one or more resource locations of each resource element group. The indicating, to the first terminal device, one or more resource locations of the at least one resource element group further includes: indicating, to the first terminal device, a location of each resource element in a resource element group to which the resource element belongs. Alternatively, the method further includes: determining, according to a predefined rule, at least one location of the at least one resource element in a resource element group to which the at least one resource element belongs.

In a possible implementation of the first aspect, the method further includes: indicating, to the first terminal device, a quantity of basic resource elements included in the at least one resource element in each resource element group.

In a possible implementation of the first aspect, each resource element group corresponds to a transmission parameter.

In a possible implementation of the first aspect, the method further includes: indicating, to the first terminal device, a correspondence between each resource element group and a transmission parameter.

In a possible implementation of the first aspect, the method further includes: indicating, to the first terminal device, a quantity of minimum scheduling units included in the basic resource element.

According to a second aspect, an embodiment of this application provides a data sending method. The method includes: learning, from a network device, of at least one resource location of at least one basic resource element and at least one pilot configuration for the at least one basic resource element, where each basic resource element corresponds to at least one pilot configuration; determining a transmission resource based on one or more resource locations of one or more of the at least one basic resource element; generating at least one pilot for the one or more basic resource elements based on at least one pilot configuration for the one or more basic resource elements; and sending data by occupying the transmission resource and based on the at least one pilot for the one or more basic resource elements.

In a possible implementation of the second aspect, the learning, from a network device, of at least one resource location of at least one basic resource element includes: learning, from the network device, of at least one resource location of at least one resource element group. The determining a transmission resource based on one or more resource locations of one or more of the at least one basic resource element includes: determining the transmission resource based on one or more resource locations of at least one resource element in a first resource element group in the at least one resource element group. Determining at least one pilot for the at least one basic resource element based on the at least one pilot configuration for the one or more basic resource elements includes: determining at least one pilot for at least one basic resource element in the first resource element group based on at least one pilot configuration for the at least one basic resource element in the first resource element group. The sending data by occupying the transmission resource and based on the at least one pilot for the one or more basic resource elements includes: sending data by occupying the transmission resource and based on the at least one pilot for the at least one basic resource element in the first resource element group. Each resource element group includes at least one resource element, each resource element includes at least one basic resource element, and a same transport block is carried by one resource element.

In a possible implementation of the second aspect, the learning, from the network device, of at least one resource location of at least one resource element group includes: learning, from the network device, of one or more resource locations of the at least one resource element in each resource element group.

In a possible implementation of the second aspect, the learning, from the network device, of at least one resource location of at least one resource element group includes: learning, from the network device, of one or more resource locations of each resource element group. The learning, from the network device, of at least one resource location of at least one resource element group further includes: learning, from the network device, of a location of each resource element in a resource element group to which the resource element belongs. Alternatively, the method further includes: determining, by the network device according to a predefined rule, at least one location of the at least one resource element in a resource element group to which the at least one resource element belongs.

In a possible implementation of the second aspect, the method further includes: learning, from the network device, of a quantity of basic resource elements included in the at least one resource element in each resource element group.

In a possible implementation of the second aspect, each resource element group corresponds to a transmission parameter.

In a possible implementation of the second aspect, the method further includes: receiving, from the network device, a correspondence between each of the at least one resource element group and a transmission parameter.

In a possible implementation of the second aspect, the method further includes: learning, from the network device, of a quantity of minimum scheduling units included in the basic resource element.

According to a third aspect, a transmission resource allocation apparatus is provided. The apparatus may be a network device, or may be a chip inside a network device. The apparatus may include a processing unit and a transceiver unit. When the apparatus is the network device, the processing unit may be a processor, and the transceiver unit may be a transceiver. The network device may further include a storage unit, and the storage unit may be a memory. The storage unit is configured to store an instruction, and the processing unit executes the instruction stored in the storage unit, so that the network device performs the method according to any one of the first aspect or the possible implementations of the first aspect. When the apparatus is the chip inside the network device, the processing unit may be a processor, and the transceiver unit may be an input/output interface, a pin, a circuit, or the like. The processing unit executes an instruction stored in a storage unit, so that the network device performs the method according to any one of the first aspect or the possible implementations of the first aspect. The storage unit may be a storage unit (for example, a register or a cache) inside the chip, or may be a storage unit (for example, a read-only memory or a random access memory) that is located outside the chip and that is inside the network device.

According to a fourth aspect, a data sending apparatus is provided. The apparatus may be a terminal device, or may be a chip inside a terminal device. The apparatus may include a processing unit and a transceiver unit. When the apparatus is the terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs the method according to any one of the second aspect or the possible implementations of the second aspect. When the apparatus is the chip inside the terminal device, the processing unit may be a processor, and the transceiver unit may be an input/output interface, a pin, a circuit, or the like. The processing unit executes an instruction stored in a storage unit, so that the terminal device performs the method according to any one of the second aspect or the possible implementations of the second aspect. The storage unit may be a storage unit (for example, a register or a cache) inside the chip, or may be a storage unit (for example, a read-only memory or a random access memory) that is located outside the chip and that is inside the terminal device.

According to a fifth aspect, an apparatus for obtaining a resource indicator value is provided. The apparatus includes a processor and a storage medium. The storage medium stores an instruction. When the instruction is run by the processor, the processor is enabled to perform the method according to any one of the first aspect or the possible implementations of the first aspect. The apparatus may be a chip or a chip system.

According to a sixth aspect, an apparatus for obtaining a resource indicator value is provided. The apparatus includes a processor and a storage medium. The storage medium stores an instruction. When the instruction is run by the processor, the processor is enabled to perform the method according to any one of the second aspect or the possible implementations of the second aspect. The apparatus may be a chip or a chip system.

According to a seventh aspect, a computer program product is provided. The computer program product includes computer program code. When the computer program code is run by a communications device, the communications device is enabled to perform the method according to any one the first aspect or the possible implementations of the first aspect.

According to an eighth aspect, a computer program product is provided. The computer program product includes computer program code. When the computer program code is run by a communications device, the communications device is enabled to perform the method according to any one of the second aspect or the possible implementations of the second aspect.

According to a ninth aspect, a computer-readable storage medium is provided, and is configured to store a computer program. The computer program is configured to execute an instruction of the method according to any one of the first aspect or the possible implementations of the first aspect.

According to a tenth aspect, a computer-readable storage medium is provided, and is configured to store a computer program. The computer program is configured to execute an instruction of the method according to any one of the second aspect or the possible implementations of the second aspect.

According to an eleventh aspect, an embodiment of this application provides a transmission resource allocation method. The method includes: determining, by a network device, at least one basic resource element; determining, by the network device, at least one pilot configuration for each of the at least one basic resource element; and indicating, by the network device to a first terminal device, at least one resource location of the at least one basic resource element and at least one pilot configuration for the at least one basic resource element.

In a possible implementation of the eleventh aspect, the method further includes: determining, by the network device, one or more basic resource elements; determining, by the network device, at least one pilot configuration for each of the one or more basic resource elements; and indicating, by the network device to a second terminal device, one or more resource locations of the one or more basic resource elements and at least one pilot configuration for the one or more basic resource elements. The at least one basic resource element and the one or more basic resource elements each include a first basic resource element. The at least one pilot configuration for the at least one basic resource element includes at least one first pilot configuration, and the at least one first pilot configuration is determined for the first basic resource element. The at least one pilot configuration for the one or more basic resource elements includes at least one second pilot configuration, and the at least one second pilot configuration is determined for the first basic resource element. Each first pilot configuration is different from each second pilot configuration.

In a possible implementation of the eleventh aspect, the method further includes: determining, by the network device, at least one resource element group, where each resource element group includes at least one resource element, and each resource element includes one or more of the at least one basic resource element. The indicating, by the network device to a first terminal device, at least one resource location of the at least one basic resource element includes: indicating, by the network device to the first terminal device, one or more resource locations of the at least one resource element group.

In a possible implementation of the eleventh aspect, the indicating, by the network device to the first terminal device, one or more resource locations of the at least one resource element group includes: indicating, by the network device to the first terminal device, one or more resource locations of the at least one resource element in each resource element group.

In a possible implementation of the eleventh aspect, the indicating, by the network device to the first terminal device, one or more resource locations of the at least one resource element group includes: indicating, by the network device to the first terminal device, one or more resource locations of each resource element group. The indicating, by the network device to the first terminal device, one or more resource locations of the at least one resource element group further includes: indicating, by the network device to the first terminal device, a location of each resource element in a resource element group to which the resource element belongs. Alternatively, the method further includes: determining, by the network device according to a predefined rule, at least one location of the at least one resource element in a resource element group to which the at least one resource element belongs.

In a possible implementation of the eleventh aspect, the method further includes: indicating, by the network device to the first terminal device, a quantity of basic resource elements included in the at least one resource element in each resource element group.

In a possible implementation of the eleventh aspect, each resource element group corresponds to a transmission parameter.

In a possible implementation of the eleventh aspect, the method further includes: indicating, by the network device to the first terminal device, a correspondence between each resource element group and a transmission parameter.

In a possible implementation of the eleventh aspect, the method further includes: indicating, by the network device to the first terminal device, a quantity of minimum scheduling units included in the basic resource element.

In a possible implementation of the eleventh aspect, the at least one basic resource element is at least two basic resource elements.

In a possible implementation of the eleventh aspect, the transmission parameter includes at least one of a transport block size and an MCS level.

According to a twelfth aspect, an embodiment of this application provides a data sending method. The method includes: learning, by a terminal device from a network device, of at least one resource location of at least one basic resource element and at least one pilot configuration for the at least one basic resource element, where each basic resource element corresponds to at least one pilot configuration; determining, by the terminal device, a transmission resource based on one or more resource locations of one or more of the at least one basic resource element; generating, by the terminal device, at least one pilot for the one or more basic resource elements based on at least one pilot configuration for the one or more basic resource elements; and sending, by the terminal device, data by occupying the transmission resource and based on the at least one pilot for the one or more basic resource elements.

In a possible implementation of the twelfth aspect, the learning, by a terminal device from a network device, of at least one resource location of at least one basic resource element includes: learning, by the terminal device from the network device, of at least one resource location of at least one resource element group. The determining, by the terminal device, a transmission resource based on one or more resource locations of one or more of the at least one basic resource element includes: determining, by the terminal device, the transmission resource based on one or more resource locations of at least one resource element in a first resource element group in the at least one resource element group. Determining, by the terminal device, at least one pilot for the at least one basic resource element based on the at least one pilot configuration for the one or more basic resource elements includes: determining, by the terminal device, at least one pilot for at least one basic resource element in the first resource element group based on at least one pilot configuration for the at least one basic resource element in the first resource element group. The sending, by the terminal device, data by occupying the transmission resource and based on the at least one pilot for the one or more basic resource elements includes: sending, by the terminal device, data by occupying the transmission resource and based on the at least one pilot for the at least one basic resource element in the first resource element group. Each resource element group includes at least one resource element, each resource element includes at least one basic resource element, and a same transport block is carried by one resource element.

In a possible implementation of the twelfth aspect, the learning, by the terminal device from the network device, of at least one resource location of at least one resource element group includes: learning, by the terminal device from the network device, of one or more resource locations of the at least one resource element in each resource element group.

In a possible implementation of the twelfth aspect, the learning, by the terminal device from the network device, of at least one resource location of at least one resource element group includes: learning, by the terminal device from the network device, of one or more resource locations of each resource element group. The learning, by the terminal device from the network device, of at least one resource location of at least one resource element group further includes: learning, by the terminal device from the network device, of a location of each resource element in a resource element group to which the resource element belongs. Alternatively, the method further includes: determining, by the network device according to a predefined rule, at least one location of the at least one resource element in a resource element group to which the at least one resource element belongs.

In a possible implementation of the twelfth aspect, the method further includes: learning, by the terminal device from the network device, of a quantity of basic resource elements included in the at least one resource element in each resource element group.

In a possible implementation of the twelfth aspect, each resource element group corresponds to a transmission parameter.

In a possible implementation of the twelfth aspect, the method further includes: receiving, by the terminal device from the network device, a correspondence between each of the at least one resource element group and a transmission parameter.

In a possible implementation of the twelfth aspect, the method further includes: learning, by the terminal device from the network device, of a quantity of minimum scheduling units included in the basic resource element.

In a possible implementation of the twelfth aspect, the at least one basic resource element is at least two basic resource elements.

In a possible implementation of the twelfth aspect, the transmission parameter includes at least one of a transport block size and an MCS level.

According to a thirteenth aspect, an embodiment of this application provides a network device, to perform the method according to any one of the first aspect or the possible implementations of the first aspect. Specifically, the network device includes a unit configured to perform the method according to any one of the first aspect or the possible implementations of the first aspect.

According to a fourteenth aspect, an embodiment of this application provides another network device. The network device includes: a transmitter, a receiver, a processor, and a memory. The transmitter, the receiver, the processor, and the memory may be connected by using a bus system. The memory is configured to store a program, an instruction, or code. The processor is configured to execute the program, the instruction, or the code in the memory, to complete the method according to any one of the first aspect or the possible implementations of the first aspect.

According to a fifteenth aspect, an embodiment of this application provides a terminal device, to perform the method according to any one of the second aspect or the possible implementations of the second aspect. Specifically, the terminal device may include a unit configured to perform the method according to any one of the second aspect or the possible implementations of the second aspect.

According to a sixteenth aspect, an embodiment of this application provides another terminal device. The terminal device includes: a transmitter, a receiver, a processor, and a memory. The transmitter, the receiver, the processor, and the memory may be connected by using a bus system. The memory is configured to store a program, an instruction, or code. The processor is configured to execute the program, the instruction, or the code in the memory, to complete the method according to any one of the second aspect, the fourth aspect, the possible implementations of the second aspect, or the possible implementations of the fourth aspect.

According to a seventeenth aspect, an embodiment of this application provides a communications system. The communications system includes the network device according to the thirteenth aspect or the fourteenth aspect and the terminal device according to the fifteenth aspect or the sixteenth aspect.

According to an eighteenth aspect, an embodiment of this application provides a computer-readable storage medium, to store a computer program. The computer program is configured to execute an instruction of the method according to any one of the first aspect, the second aspect, the possible implementations of the first aspect, or the possible implementations of the second aspect.

In the solutions provided in this application, pilots corresponding to a same basic resource element are different from each other. Therefore, a correctness percentage of detection can be increased in a scheduling-free instruction mechanism.

DETAILED DESCRIPTION OF ILLUSTRATIVE EMBODIMENTS

The following describes the technical solutions in the embodiments of this application with reference to the accompanying drawings.

Figure 1:
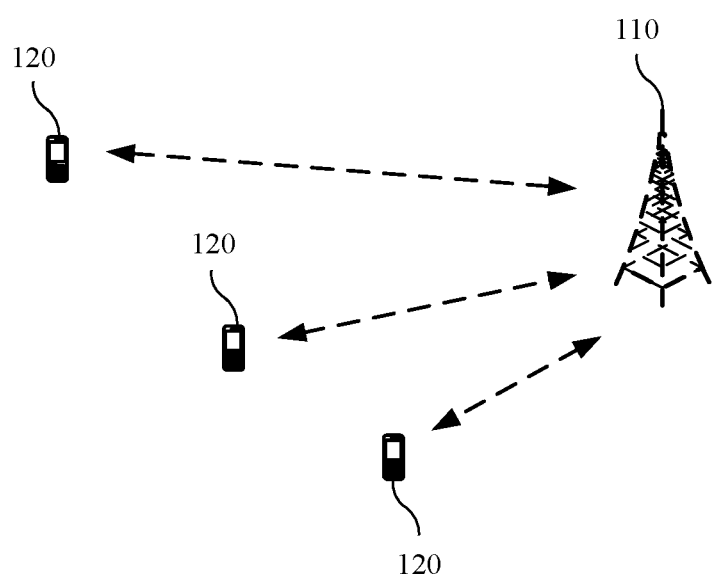
FIG. 1 is a schematic diagram of a network architecture to which embodiments of this application are applied.

FIG. 1 shows a communications system 100 to which the embodiments of this application are applied. The communications system 100 may include at least one network device 110, and a plurality of terminal devices 120 within a coverage area of the network device 110. FIG. 1 shows an example in which there is one network device and two terminal devices. Optionally, the communications system 100 may include a plurality of network devices, and within a coverage area of each network device, another quantity of terminal devices may be included. This is not limited in the embodiments of this application.

Optionally, the wireless communications system 100 may further include another network entity. The embodiments of this application are not limited thereto.

The communications system to which the embodiments of this application are applied may be a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a 5G New Radio (NR) system, another wireless communications system to which an orthogonal frequency division multiplexing (OFDM) technology is applied, and the like.

The network device in the embodiments of this application may be configured to provide a wireless communication function for the terminal devices. The network device may include various forms of macro network devices, micro network devices (also referred to as small cells), relay nodes, access points, and the like. The network device may be a network device transceiver station (BTS) in GSM or CDMA, or may be a network device (NodeB, NB) in WCDMA, or may be an evolved network device (Evolutional Node B, eNB or e-NodeB) in LTE, or may be a corresponding device gNB in a 5G network. For ease of description, in all the embodiments of this application, the foregoing apparatuses that provide a wireless communication function for the terminal device are generally referred to as network devices.

The terminal device in the embodiments of this application may also be referred to as user equipment (UE), a mobile station (MS), a mobile terminal device (Mobile Terminal), and the like. The terminal device may communicate with one or more core networks by using a radio access network (RAN). For example, the terminal device may be a mobile phone (also referred to as a "cellular" phone), a computer having a mobile terminal device, or the like. For example, the terminal device may further be a portable, pocket-sized, handheld, computer built-in, or in-vehicle mobile apparatus, which exchanges voice and/or data with the radio access network. This is not specifically limited in the embodiments of this application.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

Figure 2:
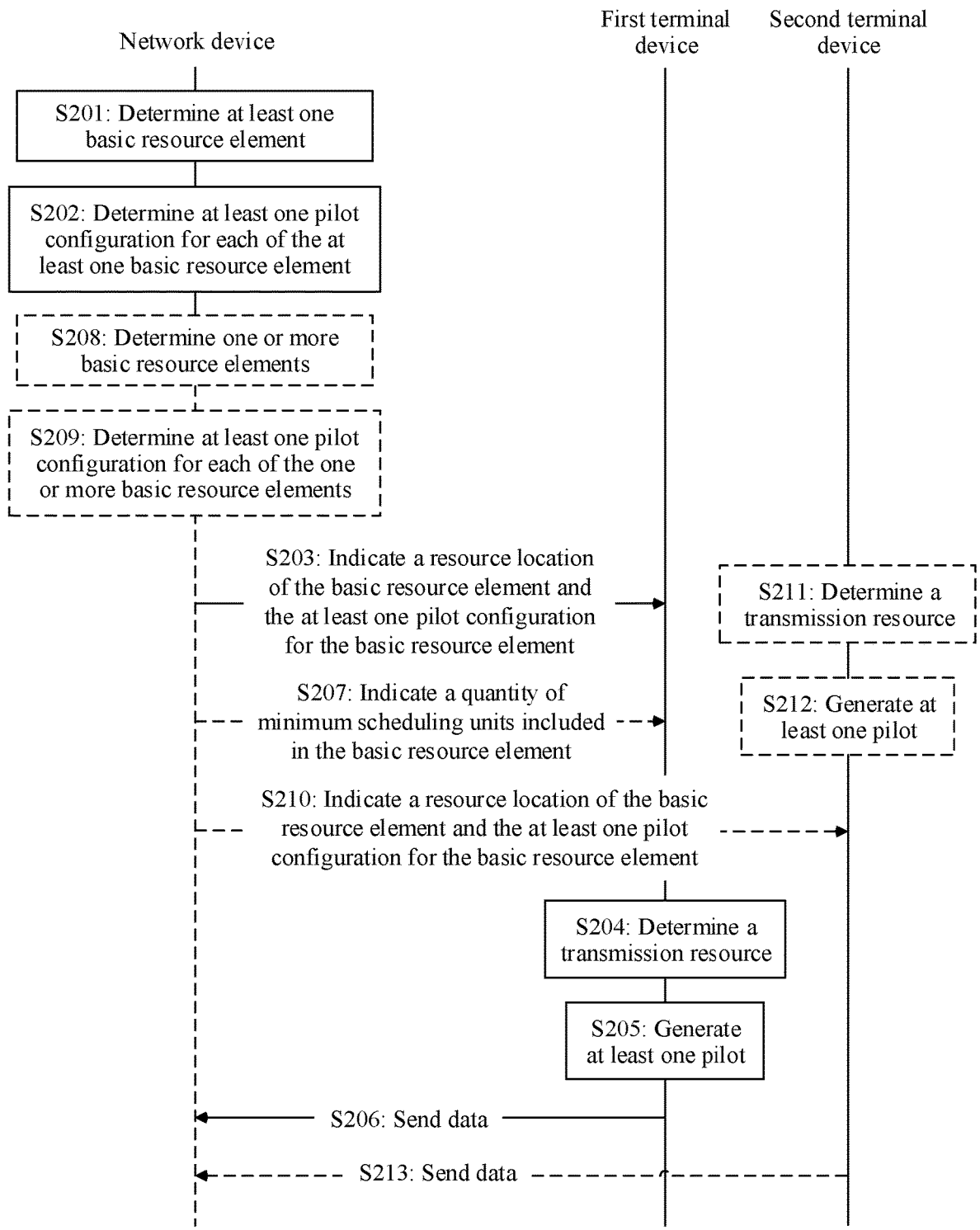
FIG. 2 is a flowchart of an embodiment of a transmission resource allocation method and a data transmission method according to this application.

FIG. 2 shows an embodiment of a transmission resource allocation method and a data transmission method according to this application, including S201, S202, S203, S204, S205, and S206.

S201: A network device determines at least one basic resource element.

In an example, the basic resource element is a minimum transmission granularity, and includes at least one minimum scheduling unit. The minimum scheduling unit refers to a minimum time-frequency resource for data transmission, for example, a physical resource block (PRB) in an LTE system. For example, the basic resource element includes K minimum scheduling units in frequency domain, and includes L slots in time domain, where L and K each are a non-negative integer. Optionally, the basic resource element may include two PRBs in frequency domain, and include one slot in time domain.

In an example, the at least one basic resource element is at least two basic resource elements. To be specific, the network device determines the at least two basic resource elements.

S202: The network device determines at least one pilot configuration for each of the at least one basic resource element.

Herein, quantities of pilot configurations determined by the network device for different basic resource elements may be the same or may be different. In addition, the pilot configurations determined by the network device for the different basic resource elements may be completely the same, may be partially the same, or may be completely different. This is not limited in this application. For example, for four basic resource elements: a basic resource element 1, a basic resource element 2, a basic resource element 3, and a basic resource element 4, the network device may determine a pilot configuration 1 and a pilot configuration 2 for the basic resource element 1, determine the pilot configuration 1 and the pilot configuration 2 for the basic resource element 2, determine the pilot configuration 2 and a pilot configuration 3 for the basic resource element 3, and determine a pilot configuration 4 for the basic resource element 4.

Herein, the at least one pilot configuration determined by the network device for a same basic resource element is different from each other. In an example, the pilot configuration includes at least one of a pilot pattern, a pilot sequence identification number, and a cyclic shift. It may be ensured, by determining at least one of different pilot patterns, different pilot sequence identification numbers, and different cyclic shifts, that pilots generated based on the pilot configuration are different. In an example, different pilot sequences (for example, ZC sequences) may be generated by configuring different offset values (for example, cyclic shifts, where CS=0, 2, 4, 6, . . . , and 10) and based on a same root sequence. For example, same pilot patterns may be configured for a first part of pilots (to be specific, the first part of the pilots are transmitted on a same time-frequency resource), but pilot sequences different from each other may be configured for the first part of the pilots, and another type of same pilot patterns are configured for a second part of pilots (to be specific, the second part of the pilots are transmitted on a same time-frequency resource, but the time-frequency resource for transmitting the second part of the pilots is different from the time-frequency resource for transmitting the first part of the pilots), but pilot sequences different from each other are configured for the second part of the pilots.

In an example, pilot sequences of pilots corresponding to a same basic resource element are orthogonal. Assuming that one basic resource element corresponds to three pilots: a pilot 1, a pilot 2, and a pilot 3, manners of generating pilot sequences of the three pilots are as follows:

Manner 1

$$RS1:\ x_q(m) = e^{j\alpha 1 m} e^{-j\frac{\pi qm(m+1)}{N_{ZC}^{RS}}}, 0 \leq m \leq N_{ZC}^{RS} - 1;$$

$$RS2:\ x_q(m) = e^{j\alpha 2 m} e^{-j\frac{\pi qm(m+1)}{N_{ZC}^{RS}}}, 0 \leq m \leq N_{ZC}^{RS} - 1;\ \text{and}$$

$$RS3:\ x_q(m) = e^{j\alpha 3 m} e^{-j\frac{\pi qm(m+1)}{N_{ZC}^{RS}}}, 0 \leq m \leq N_{ZC}^{RS} - 1.$$

The length $N_{ZC}^{RS}$ of a Zadoff-Chu sequence is a largest prime number less than a length $M_{sc}^{RS}$ of a pilot sequence; q=f(Virtual_Cell_ID), and Virtual_Cell_ID is configured by the network device, or q=f(Cell_ID); and α1/2/3 is configured by the network device, and in an example, α1≠α2≠α3.

Manner 2

$$RS1:\ x_{q1}(m) = e^{j\alpha 1 m} e^{-j\frac{\pi q1 m(m+1)}{N_{ZC}^{RS}}}, 0 \leq m \leq N_{ZC}^{RS} - 1;$$

$$RS2:\ x_{q2}(m) = e^{j\alpha 2 m} e^{-j\frac{\pi q2 m(m+1)}{N_{ZC}^{RS}}}, 0 \leq m \leq N_{ZC}^{RS} - 1;\ \text{and}$$

$$RS3:\ x_{q3}(m) = e^{j\alpha 3 m} e^{-j\frac{\pi q3 m(m+1)}{N_{ZC}^{RS}}}, 0 \leq m \leq N_{ZC}^{RS} - 1.$$

The length $N_{ZC}^{RS}$ of a Zadoff-Chu sequence is a largest prime number less than a length $M_{sc}^{RS}$ of a pilot sequence; q1/2/3=f (Virtual_Cell_ID1/2/3), Virtual_Cell_ID1/2/3 is configured by the network device, and in an example, q1/2/3 corresponding to Virtual_Cell_ID1/2/3 are co-prime; and α1/2/3 is configured by the network device, and in an example, α1≠α2≠α3.

Manner 3

$$RS1:\ x_{q1}(m) = e^{j\alpha m} e^{-j\frac{\pi q1 m(m+1)}{N_{ZC}^{RS}}}, 0 \leq m \leq N_{ZC}^{RS} - 1;$$

$$RS2:\ x_{q2}(m) = e^{j\alpha m} e^{-j\frac{\pi q2 m(m+1)}{N_{ZC}^{RS}}}, 0 \leq m \leq N_{ZC}^{RS} - 1;\ \text{and}$$

$$RS3:\ x_{q3}(m) = e^{j\alpha m} e^{-j\frac{\pi q3 m(m+1)}{N_{ZC}^{RS}}}, 0 \leq m \leq N_{ZC}^{RS} - 1.$$

The length $N_{ZC}^{RS}$ of a Zadoff-Chu sequence is a largest prime number less than a length $M_{sc}^{RS}$ of a pilot sequence; q1/2/3=f(Virtual_Cell_ID1/2/3), Virtual_Cell_ID1/2/3 is configured by the network device, and in an example, q1/2/3 corresponding to Virtual_Cell_ID1/2/3 are co-prime; and α is configured by the network device.

Figure 3:
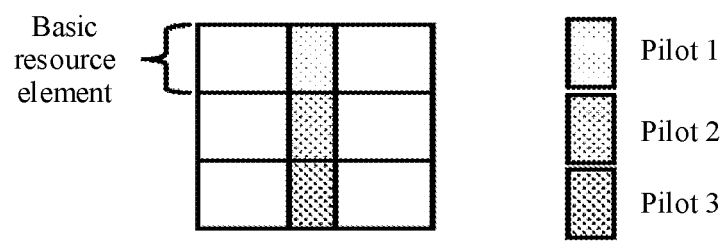
FIG. 3 is a schematic diagram of a correspondence between basic resource elements and pilots according to an embodiment of this application.
Figure 4:
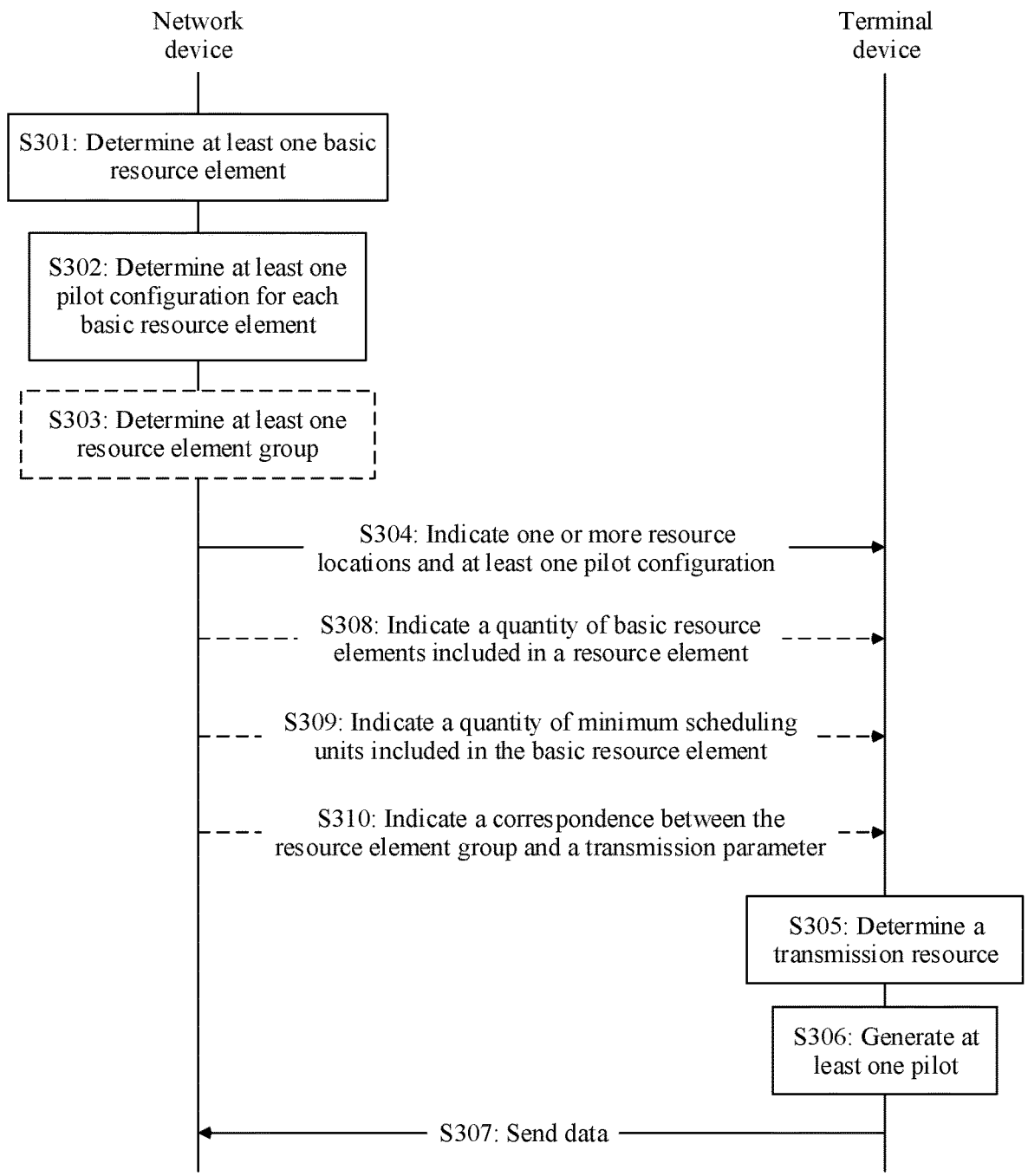
FIG. 4 is a flowchart of another embodiment of a transmission resource allocation method and a data transmission method according to this application.

In an example, the network device independently generates a pilot for each basic resource element. As shown in FIG. 3, each of the at least one basic resource element corresponds to a complete pilot, instead of corresponding to only a part of the complete pilot. Channel information of a single link may be obtained by using the complete pilot. Particularly when a plurality of pilot sequences are carried on a same resource, the channel information of the single link may still be obtained by using the complete pilot. On the contrary, when a plurality of pilot sequences are carried on a same resource, the channel information of the single link cannot be obtained by depending on only a part of the complete pilot.

S203: The network device indicates, to a first terminal device, at least one resource location of the at least one basic resource element and at least one pilot configuration for the at least one basic resource element.

Herein, the resource location and the pilot configuration may be indicated by using same signaling, or may be indicated by using different signaling. When the resource location and the pilot configuration are carried by using different signaling, the network device may send, before sending signaling indicating the resource location, signaling indicating the pilot configuration, or send, after sending signaling indicating the resource location, signaling indicating the pilot configuration, or simultaneously send signaling indicating the resource location and signaling indicating the pilot configuration. This is not limited in this application.

In an example, pilot indication manners are as follows:

Method 1: Virtual_Cell_ID=Cell ID, and α is configured by the network device, and is used for all the basic resource elements, one resource element, or one resource element group.

Method 2: Virtual_Cell_ID, and α is configured by the network device, and is used for all the basic resource elements, one resource element, or one resource element group.

Method 3: Virtual_Cell_ID, α is configured by the network device, and each basic resource element is independently configured.

Method 4: Virtual_Cell_ID is configured by the network device, and is used for all the basic resource elements, one resource element, or one resource element group; and α is configured by the network device, and each basic resource element is independently configured.

Method 5: α is configured by the network device, and is used for all the basic resource elements, one resource element, or one resource element group; and Virtual_Cell_ID is configured by the network device, and each basic resource element is independently configured.

Optionally, this embodiment further includes S207.

S207: The network device indicates, to the first terminal device, a quantity of minimum scheduling units included in the basic resource element.

In an example, the quantity of the minimum scheduling units included in the basic resource element is carried by RRC signaling, and the signaling is user-specific.

In an example, the quantity of the minimum scheduling units included in the basic resource element may also be agreed in a protocol. In this case, the network device does not need to indicate, to the first terminal device, the quantity of the minimum scheduling units included in the basic resource element.

In an example, when the basic resource element includes one minimum scheduling unit, that the pilot configuration includes a cyclic shift is used as an example, and signaling sent by the network device to the terminal device is as follows:

Resource configuration:
  {Pilot configuration:
    Cyclic shift: K1
    Frequency domain resources: {L1, L2, ..., and Li}
    MCS configuration: M1
  }

To be specific, the network device sends the cyclic shift to the first terminal device to indicate the pilot configuration, and sends a sequence number of a minimum scheduling unit to the first terminal device to indicate a resource location of the basic resource element.

In an example, when the basic resource element includes at least two minimum scheduling units, that the pilot configuration includes a cyclic shift is used as an example, and signaling sent by the network device to the terminal device is as follows:

Resource configuration:
  {Pilot configuration:
    Cyclic shift:
    Frequency domain resources: {L1, L2, ..., and Li}
    MCS configuration: M
    Basic resource element size: K2
  }

To be specific, the network device sends the cyclic shift to the first terminal device to indicate the pilot configuration, and sends a sequence number of a minimum scheduling unit to the first terminal device to indicate a resource location of the basic resource element. In addition, the network device further sends the basic resource element size (for example, the quantity of the minimum scheduling units included in the basic resource element) to the first terminal device.

S204: The first terminal device determines a transmission resource based on one or more resource locations of one or more of the at least one basic resource element.

In an example, the basic resource element is a minimum resource element. During actual transmission, P basic resource elements may form a resource element to carry a same transport block, where P is a positive integer. A quantity of resource elements (RE) required after modulation and coding is obtained based on a transport block size and an MCS level, and then P is found, where a quantity of REs that are in P basic resource elements and that are used to carry data is closest to and greater than or equal to the quantity of the REs required after modulation and coding. For example, if a size of a transport block corresponding to a URLLC packet of 32 bytes is 256 bits, and an MCS is configured to be 16QAM with code rate=0.5. It can be learned from the foregoing calculation method that, when one basic resource element includes two PRBs in frequency domain, and includes one slot in time domain, each transport block occupies two basic resource elements.

S205: The first terminal device generates at least one pilot for the at least one basic resource element based on at least one pilot configuration for the one or more basic resource elements.

In an example, pilot generation manners are as follows:

$$x_q(m) = e^{j\alpha(m \bmod N_{BU}^{RS})} e^{-j\frac{\pi q(m \bmod N_{BU}^{RS})(m \bmod N_{BU}^{RS}+1)}{N_{ZC}^{RS}}}, \quad \text{Manner 1}$$

$$0 \leq m \leq N_{ZC}^{RS} - 1$$

The length $N_{ZC}^{RS}$ of a Zadoff-Chu sequence is a largest prime number less than a total length $M_{sc}^{RS}$ of a pilot sequence, $M_{sc}^{RS} = K N_{BU}^{RS}$, and K is a quantity of basic resource elements used for transmission; q=f (UplinkRS_ID); UplinkRS_ID is a cell ID or is configured by the network device; and α is configured by the network device. $N_{BU}^{RS}$ is a length of a pilot in a basic resource element, and is agreed in a protocol or configured by a base station, and the configuration includes a cell-specific configuration and a user-specific configuration.

$$x_q(m) = e^{j\alpha_i(m \bmod N_{BU}^{RS})} e^{-j\frac{\pi q_i(m \bmod N_{BU}^{RS})(m \bmod N_{BU}^{RS}+1)}{N_{ZC}^{RS}}}, \quad \text{Manner 2}$$

$$0 \leq m \leq N_{ZC}^{RS} - 1, \text{ where } i = \lfloor m/N_{BU}^{RS} \rfloor,$$

and

The length $N_{ZC}^{RS}$ of a Zadoff-Chu sequence is a largest prime number less than a total length $M_{sc}^{RS}$ of a pilot sequence, $M_{sc}^{RS} = KN_{BU}^{RS}$, and K is a quantity of basic resource elements used during transmission; q=f(UplinkRSID$_i$, and UplinkRSID$_i$ is a cell ID or configured by the network device, where typically, $q_i = q_j$, i≠j; and $\alpha_i$ is configured by the network device, where typically, $\alpha_i = \alpha_j$, i≠j. $N_{BU}^{RS}$ is a length of a pilot in a basic resource element, and is agreed in a protocol or configured by a base station, and the configuration includes a cell-specific configuration and a user-specific configuration.

S206: The first terminal device sends data by occupying the transmission resource and based on at least one pilot for the one or more basic resource elements.

Optionally, this embodiment further includes S208, S209, S210, S211, S212, and S213.

S208: The network device determines one or more basic resource elements.

Herein, the at least one basic resource element and the one or more basic resource elements may be completely the same, partially the same, or completely different. This is not limited in this application.

S209: The network device determines at least one pilot configuration for each of the one or more basic resource elements.

S210: The network device indicates, to a second terminal device, one or more resource locations of the one or more basic resource elements and at least one pilot configuration for the one or more basic resource elements.

Herein, the at least one basic resource element and the one or more basic resource elements each include a first basic resource element; the at least one pilot configuration for the at least one basic resource element includes at least one first pilot configuration, and the at least one first pilot configuration is determined for the first basic resource element; the at least one pilot configuration for the one or more basic resource elements includes at least one second pilot configuration, and the at least one second pilot configuration is determined for the first basic resource element; and each first pilot configuration is different from each second pilot configuration.

In an example, pilots that are indicated by the network device to different terminal devices and that correspond to a same basic resource element are different from each other. Therefore, a plurality of terminal devices send data on a same basic resource element, and pilots between the plurality of terminal devices can also remain orthogonal.

For example, as shown in Table 1, a pilot 1, a pilot 2, and a pilot 3 are different pilots, a terminal device 1, a terminal device 2, a terminal device 3, and a terminal device 4 are different terminal devices, and a basic resource element 1, a basic resource element 2, and a basic resource element 3 are different basic resource elements. The network device indicates, to the terminal device 1, the pilot 1 corresponding to the basic resource element 1, the pilot 1 corresponding to the basic resource element 2, and the pilot 1 corresponding to the basic resource element 3, indicates, to the terminal device 2, the pilot 2 corresponding to the basic resource element 1 and the pilot 2 corresponding to the basic resource element 2, indicates, to the terminal device 3, the pilot 2 corresponding to the basic resource element 3, and indicates, to the terminal device 4, the pilot 3 corresponding to the basic resource element 1 and the pilot 3 corresponding to the basic resource element 3. It can be learned that pilots that are received by the terminal device 1, the terminal device 2, the terminal device 3, and the terminal device 4 and that correspond to the basic resource element 1 are different from each other, pilots that are received by the terminal device 1, the terminal device 2, the terminal device 3, and the terminal device 4 and that correspond to the basic resource element 2 are different from each other, and pilots that are received by the terminal device 1, the terminal device 2, the terminal device 3, and the terminal device 4 and that correspond to the basic resource element 3 are different from each other.

TABLE 1

| | Terminal device | | | |
|---|---|---|---|---|
| Basic resource element | Terminal device 1 | Terminal device 2 | Terminal device 3 | Terminal device 4 |
| Basic resource element 1 | Pilot 1 | Pilot 2 | X | Pilot 3 |
| Basic resource element 2 | Pilot 1 | Pilot 2 | X | X |
| Basic resource element 3 | Pilot 1 | X | Pilot 2 | Pilot 3 |

For another example, as shown in Table 2, a pilot 1, a pilot 2, and a pilot 3 are different pilots, a terminal device 1, a terminal device 2, a terminal device 3, and a terminal device 4 are different terminal devices, and a basic resource element 1, a basic resource element 2, and a basic resource element 3 are different basic resource elements. The network device sends, to the terminal device 1, the pilot 1 corresponding to the basic resource element 1, the pilot 2 corresponding to the basic resource element 2, and the pilot 3 corresponding to the basic resource element 3, sends, to the terminal device 2, the pilot 2 corresponding to the basic resource element 1 and the pilot 1 corresponding to the basic resource element 2, sends, to the terminal device 3, the pilot 1 corresponding to the basic resource element 3, and sends, to the terminal device 4, the pilot 3 corresponding to the basic resource element 1 and the pilot 2 corresponding to the basic resource element 3. It can be learned that pilots that are received by the terminal device 1, the terminal device 2, the terminal device 3, and the terminal device 4 and that correspond to the basic resource element 1 are different from each other, pilots that are received by the terminal device 1, the terminal device 2, the terminal device 3, and the terminal device 4 and that correspond to the basic resource element 2 are different from each other, and pilots that are received by the terminal device 1, the terminal device 2, the terminal device 3, and the terminal device 4 and that correspond to the basic resource element 3 are different from each other.

TABLE 2

| | Terminal device | | | |
|---|---|---|---|---|
| Basic resource element | Terminal device 1 | Terminal device 2 | Terminal device 3 | Terminal device 4 |
| Basic resource element 1 | Pilot 1 | Pilot 2 | X | Pilot 3 |
| Basic resource element 2 | Pilot 2 | Pilot 1 | X | X |
| Basic resource element 3 | Pilot 3 | X | Pilot 1 | Pilot 2 |

In other words, by using such a solution, the network device may choose to send, to different terminal devices, different pilots corresponding to the basic resource element, so that the different terminal devices can use the different pilots to send data on the basic resource element, and the network device can distinguish between the different terminal devices based on the pilots.

S211: The second terminal device determines a transmission resource based on one or more resource locations of the one or more of the at least one basic resource element.

S212: The second terminal device generates at least one pilot for the at least one basic resource element based on at least one pilot configuration for the one or more basic resource elements.

S213: The second terminal device sends data by occupying the transmission resource and based on at least one pilot for the one or more basic resource elements.

For technical details in S208, S209, S210, S211, S212, and S213, refer to S201, S202, S203, S204, S205, and S206 respectively. Details are not described herein.

A sequence of the steps in this embodiment is not limited to the sequence shown in FIG. 2. The steps may be performed in different sequences, or may be performed simultaneously. For example, S203 and S207 may be implemented by using a piece of signaling sent by the network device to the first terminal device. This is not limited in this application.

In this embodiment, the network device determines at least one basic transmission unit, and generates at least one pilot for a same basic resource element. To be specific, pilots are generated segment by segment. In addition, segment lengths of users sharing a time-frequency resource are consistent, thereby ensuring orthogonality of segmented pilots. Orthogonal pilots help the network device identify users, and help channel estimation of a single link. Therefore, in a scheduling-free instruction mechanism, a correctness percentage of detection can be increased by using the solution provided in this embodiment.

FIG. 3 shows another embodiment of a transmission resource allocation method according to this application, including S301, S302, S303, S304, S305, and S306.

S301: A network device determines at least one basic resource element, where each of the at least one basic resource element corresponds to at least one pilot, a first basic resource element in the at least one basic resource element corresponds to at least two pilots, and the at least two pilots are different.

S302: The network device determines at least one pilot configuration for each of the at least one basic resource element.

S303: The network device determines at least one resource element group, where each resource element group includes at least one resource element, and each resource element includes one or more of the at least one basic resource element.

Herein, resource locations of the at least one resource element group may overlap (to be specific, some or all of basic resource elements in the at least one resource element group may be the same, in other words, one basic resource element may belong to different resource element groups), or may not overlap (to be specific, one basic resource element can belong to only one basic element group). This is not limited in this application.

In an example, the network device classifies the at least one basic resource element into different resource elements in different manners, and resource elements obtained through classification in each manner form one resource element group. For example, assuming that the network device determines eight basic resource elements, the network device may determine a resource element including one basic resource element, and such eight resource elements form a first resource element group, or may determine a resource element including two basic resource elements, and such four resource elements form a second resource element group.

S304: The network device indicates, to a terminal device, one or more resource locations of the at least one resource element group and at least one pilot configuration for the at least one basic resource element.

Optionally, in S304, the network device indicates, to the terminal device, one or more resource locations of the at least one resource element in each resource element group.

In an example, the resource locations of the resource elements may be indicated by indicating a sequence number of a basic resource element in a transmission pool, where the basic resource element is a frequency domain start location of each resource element. Herein, the transmission pool is a set of basic resource elements corresponding to pilots sent by the network device to the terminal device. For example, for a resource element group, where a resource element in the resource element group includes one basic resource element, a frequency domain start location of the resource element in the resource element group is an $n^{th}$ basic resource element in the transmission pool, where n=1, 2, ..., or Z; and for a resource element group, where a resource element in the resource element group includes two basic resource elements, a frequency domain start location of the resource element in the resource element group is an $m^{th}$ basic resource element in the transmission pool, where m=2, 4, ..., or floor(Z/2)*2−1.

In another example, the resource locations of the resource elements may be indicated by indicating a sequence number of a minimum scheduling unit (for example, a PRB) within a transmission bandwidth, where the minimum scheduling unit is a frequency domain start location of a resource element in each resource element group. For example, a transmission bandwidth of the terminal device is 20 MHz, and includes 100 PRBs, where a scheduling-free instruction resource pool includes one to ten PRBs, a frequency domain of a basic resource element includes two PRBs, and for a resource element group, where a resource element in the resource element group includes one basic resource element, a frequency domain start location of the resource element in the resource element group is an $n^{th}$ PRB, where n=1, 3, 5, 7, or 9; and for a resource element group, where a resource element in the resource element group includes two basic resource elements, a frequency domain start location of the resource element in the resource element group is an $m^{th}$ PRB, where m=2 or 6.

In an example, frequency domain resources of different resource element groups may overlap, but start location sets of resource elements in the groups are different.

In an example, when a resource element group includes a plurality of resource elements, the terminal device randomly selects one or more resource elements from the plurality of resource elements to perform current transmission, or the terminal device selects one resource or more resource elements from the plurality of resource elements according to a predefined frequency hopping rule to perform current transmission; or when a resource element group includes one resource element, the terminal device performs current transmission on the resource element.

Optionally, in S304, the network device indicates, to the terminal device, one or more resource locations of each resource element group.

In this case, optionally, in S304, the network device indicates, to the terminal device, a location of each resource element in a resource element group to which the resource element belongs.

pilots that are received by the terminal device 1, the terminal device 2, and the terminal device 3 and that correspond to the basic resource element 2 are different from each other, and pilots that are received by the terminal device 1, the terminal device 2, and the terminal device 3 and that correspond to the basic resource element 3 are different from each other.

TABLE 3

| Basic resource element | Terminal device | | | | | |
|---|---|---|---|---|---|---|
| | Terminal device 1 (resource element group 1) | Terminal device 1 (resource element group 2) | Terminal device 2 (resource element group 1) | Terminal device 2 (resource element group 2) | Terminal device 3 (resource element group 1) | Terminal device 3 (resource element group 2) |
| Basic resource element 1 | X | Pilot 2 | X | Pilot 1 | X | Pilot 3 |
| Basic resource element 2 | X | Pilot 2 | X | Pilot 1 | X | Pilot 3 |
| Basic resource element 3 | Pilot 1 | X | Pilot 3 | X | Pilot 2 | X |

Alternatively, optionally, the network device determines, according to a predefined rule (for example, a frequency hopping rule), a location of each resource element in a resource element group to which the resource element belongs, and the terminal device determines, according to the predefined rule, the location of each resource element in the resource element group to which the resource element belongs.

In an example, the network device may indicate the predefined rule to the terminal device, or the predefined rule may be agreed in a protocol.

In an example, pilots that are indicated by the network device to different terminal devices and that correspond to a same basic resource element are different from each other. For example, as shown in Table 3, a pilot 1, a pilot 2, and a pilot 3 are different pilots, a terminal device 1, a terminal device 2, and a terminal device 3 are different terminal devices, and a basic resource element 1, a basic resource element 2, and a basic resource element 3 are different basic resource elements. The network device sends, to the terminal device 1, the pilot 1 corresponding to the basic resource element 3 that belongs to a resource element group 1, the pilot 2 corresponding to the basic resource element 1 that belongs to a resource element group 2, and the pilot 2 corresponding to the basic resource element 2 that belongs to the resource element group 2, sends, to the terminal device 2, the pilot 3 corresponding to the basic resource element 3 that belongs to the resource element group 1, the pilot 1 corresponding to the basic resource element 1 that belongs to the resource element group 2, and the pilot 1 corresponding to the basic resource element 2 that belongs to the resource element group 2, and sends, to the terminal device 3, the pilot 2 corresponding to the basic resource element 3 that belongs to the resource element group 1, the pilot 3 corresponding to the basic resource element 1 that belongs to the resource element group 2, and the pilot 3 corresponding to the basic resource element 2 that belongs to the resource element group 2. It can be learned that, pilots that are received by the terminal device 1, the terminal device 2, and the terminal device 3 and that correspond to the basic resource element 1 are different from each other, S305: The terminal device determines a transmission resource based on one or more resource locations of at least one resource element in a first resource element group in the at least one resource element group.

In an example, when the at least one resource element group is at least two resource element groups, the terminal device obtains, based on a transport block size and an MCS level, a quantity of REs required after modulation and coding, and then selects a resource element group from the at least one resource element group. A quantity of REs that are in basic resource elements included in at least one resource element in the resource element group and that are used to carry data is closest to and greater than or equal to the quantity of the REs required after modulation and coding.

For example, a transport block size 1 corresponding to a URLLC packet of 32 bytes is 256 bits, and a transport block size 2 corresponding to a URLLC packet of 50 bytes is 400 bits. An MCS 1 is configured to be 16QAM with code rate=0.4, and an MCS 2 is configured to be QPSK with code rate=0.4. The transport block size 1 and the MCS 1, the transport block size 1 and the MCS 2, the transport block size 2 and the MCS 1, and the transport block size 2 and the MCS 2 that correspond to current transmission need to occupy two, four, four, and eight basic resource elements respectively. If a current URLLC packet<the transport block size 1, when the terminal device determines that current transmission still has a retransmission opportunity before a latency limit, the MCS 1 and a resource element group are used, where a resource element in the resource element group includes two basic resource elements; or when the terminal device determines that current transmission has no retransmission opportunity before a latency limit, the MCS 2 and a resource element group are used, where a resource element in the resource element group includes four basic resource elements. If a current URLLC packet>the transport block size 1, when the terminal device determines that current transmission still has a retransmission opportunity before a latency limit, the MCS 1 and a resource element group are used, where a resource element in the resource element group includes four basic resource elements; or when the terminal device finds that current transmission has no retransmission opportunity before a latency limit, the MCS 2 and a resource element group are used, where a resource element in the resource element group includes eight basic resource elements.

In an example, when at least one resource element in a resource element group cannot carry one URLLC packet, where a resource element in the resource element group includes a largest quantity of basic resource elements, the URLLC packet may be split into a plurality of transport blocks for sending at different time.

S306: The terminal device determines at least one pilot for at least one basic resource element in the first resource element group based on at least one pilot configuration for the at least one basic resource element in the first resource element group.

S307: The terminal device sends data by occupying the transmission resource and based on the at least one pilot for the at least one basic resource element in the first resource element group.

In this embodiment, each resource element group includes at least one resource element. Each resource element includes at least one basic resource element. A same transport block is carried by one resource element.

Optionally, this embodiment further includes S308.

S308: The network device indicates, to the terminal device, a quantity of basic resource elements included in the at least one resource element in each resource element group.

In an example, the quantity of the basic resource elements included in the at least one resource element in each resource element group may alternatively be agreed in a protocol. In this case, the network device does not need to indicate, to the terminal device, the quantity of the basic resource elements included in the at least one resource element in each resource element group.

Optionally, this embodiment further includes S309.

S309: The network device indicates, to the terminal device, a quantity of minimum scheduling units included in the basic resource element.

In this embodiment, the network device determines at least one basic transmission unit, and generates at least one pilot for a same basic resource element. To be specific, pilots are generated segment by segment. In addition, segment lengths of users sharing a time-frequency resource are consistent, thereby ensuring orthogonality of segmented pilots. Orthogonal pilots help the network device identify users, and help channel estimation of a single link. Therefore, in a scheduling-free instruction mechanism, a correctness percentage of detection can be increased by using the solution provided in this embodiment.

Optionally, each of the at least one resource element group corresponds to a transmission parameter.

Optionally, this embodiment further includes S310.

S310: The network device indicates a correspondence between the at least one resource element group and the transmission parameter to the terminal device.

In an example, the correspondence between the at least one resource element group and the transmission parameter may alternatively be agreed on in a protocol. In this case, the network device does not need to indicate the correspondence between the at least one resource element group and the transmission parameter to the terminal device.

Optionally, the transmission parameter includes at least one of a transport block size and an MCS level.

In an example, each resource element group corresponds to one transport block size. The terminal selects a transport block size greater than or equal to and closest to a size of a data block that currently needs to be transmitted and a corresponding resource element group, to send data.

In another example, each resource element group corresponds to one MCS. The terminal selects a resource element group whose size is greater than or equal to and closest to a size of a resource that currently needs to be transmitted, to send the data.

In still another example, each resource element group corresponds to a combination of a transport block size and an MCS. For example, the resource element group 1 corresponds to a combination of the transport block size 1 and the MCS 1, the resource element group 2 corresponds to a combination of the transport block size 2 and the MCS 1, the resource element group 3 corresponds to a combination of the transport block size 1 and the MCS 2, and the resource element group 4 corresponds to a combination of the transport block size 2 and the MCS 2. Alternatively, each resource element group corresponds to a different resource size required for a combination of a transport block size and an MCS. For example, the resource element group 1 corresponds to a combination of the transport block size 1 and the MCS 1, the resource element group 2 corresponds to a combination of the transport block size 2 and the MCS 1 and a combination of the transport block size 1 and the MCS 2, and a resource element group 3 corresponds to a combination of the transport block sizes 2 and the MCS 2.

When each resource element group corresponds to the transmission parameter, the network device can determine, based on a resource element group used by the terminal device, a transmission parameter used by the terminal device. For example, when each resource element group corresponds to a transport block size, the network device may determine, based on the resource element group used by the terminal device, a transport block size used by the terminal device. This manner helps the network device determine the transmission parameter used by the terminal device, and complexity of blind detection is reduced.

For technical details in S301, S302, S304, S305, S306, S307, and S309, refer to S201, S202, S203, S204, S205, S206, and S207 respectively. Details are not described herein.

In an example, when a classification manner of the resource element group is specified by the network device, that a pilot configuration includes a cyclic shift and the resource element group corresponds to an MCS level is used as an example, and signaling sent by the network device to the terminal device is as follows:

```
Resource configuration:
    {Pilot configuration:
        Cyclic shift: K1
    MCS configuration and a frequency domain resource 1:
        MCS configuration: M1
        Frequency domain resources: {L11, L12, ..., and L1i}
    MCS configuration and a frequency domain resource 2:
        MCS configuration: M2
        Frequency domain resources: {L21, L22, ..., and L2i}
    Basic resource element size: K2
    }
```

In other words, the network device sends the cyclic shift to the terminal device to indicate the pilot configuration, sends a sequence number of a start minimum scheduling unit of a resource element in each resource element group to the terminal device to indicate a resource location of the resource element, and sends an MCS configuration corresponding to each resource element group to the terminal device.

In another example, when a classification manner of the resource element group is agreed in a protocol or freely selected by the terminal device, that the pilot configuration includes the cyclic shift and the resource element group corresponds to an MCS level is used as an example, and signaling sent by the network device to the terminal device is as follows:

```
Resource configuration:
  {Pilot configuration:
    Cyclic shift: K1
  Frequency domain resources: {L1, L2, ..., and Li}
  MCS configurations: M1 and M2
  Basic resource element size: K
  }
```

In other words, the network device sends the cyclic shift to the terminal device to indicate the pilot configuration, sends a sequence number of a minimum scheduling unit of a basic resource element to the terminal device to indicate a resource location, and sends an MCS configuration corresponding to each resource element group to the terminal device.

Figure 5:
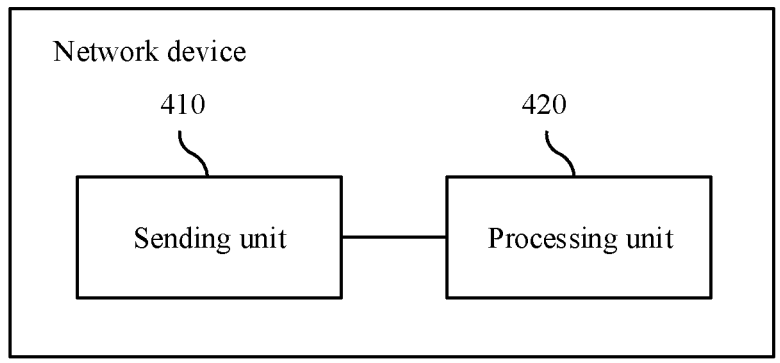
FIG. 5 is a structural diagram of an embodiment of a network device according to this application.

FIG. 5 shows an embodiment of a terminal device according to this application. The terminal device includes a sending unit 410 and a processing unit 420.

The processing unit 420 is configured to determine at least one basic resource element.

The processing unit 420 is further configured to determine at least one pilot configuration for each of the at least one basic resource element.

The sending unit 410 is configured to indicate, to a first terminal device, at least one resource location of the at least one basic resource element and at least one pilot configuration for the at least one basic resource element.

Optionally, the processing unit 420 is further configured to determine one or more basic resource elements. The processing unit 420 is further configured to determine at least one pilot configuration for each of the one or more basic resource elements. The sending unit 410 is further configured to indicate, to a second terminal device, one or more resource locations of the one or more basic resource elements and at least one pilot configuration for the one or more basic resource elements. The at least one basic resource element and the one or more basic resource elements each include a first basic resource element. The at least one pilot configuration for the at least one basic resource element includes at least one first pilot configuration, and the at least one first pilot configuration is determined for the first basic resource element. The at least one pilot configuration for the one or more basic resource elements includes at least one second pilot configuration, and the at least one second pilot configuration is determined for the first basic resource element. Each first pilot configuration is different from each second pilot configuration.

Optionally, the processing unit 420 is further configured to determine at least one resource element group, where each resource element group includes at least one resource element, and each resource element includes one or more of the at least one basic resource element. The sending unit 410 is further configured to indicate, to the first terminal device, one or more resource locations of the at least one resource element group.

Optionally, the sending unit 410 is further configured to indicate, to the first terminal device, one or more resource locations of the at least one resource element in each resource element group.

Optionally, the sending unit 410 is further configured to indicate, to the first terminal device, one or more resource locations of each resource element group. The sending unit 410 is further configured to indicate, to the first terminal device, a location of each resource element in a resource element group to which the resource element belongs. Alternatively, the processing unit 420 is further configured to determine, according to a predefined rule, at least one location of the at least one resource element in a resource element group to which the at least one resource element belongs.

Optionally, the sending unit 410 is further configured to indicate, to the first terminal device, a quantity of basic resource elements included in the at least one resource element in each resource element group.

Optionally, each resource element group corresponds to a transmission parameter.

Optionally, the sending unit 410 is further configured to indicate, to the first terminal device, a correspondence between each resource element group and a transmission parameter.

Optionally, the sending unit 410 is further configured to indicate, to the first terminal device, a quantity of minimum scheduling units included in the basic resource element.

Optionally, the at least one basic resource element is at least two basic resource elements.

Optionally, the transmission parameter includes at least one of a transport block size and an MCS level.

For detailed descriptions of technical details and beneficial effects in this embodiment, refer to the foregoing method embodiment.

Figure 6:
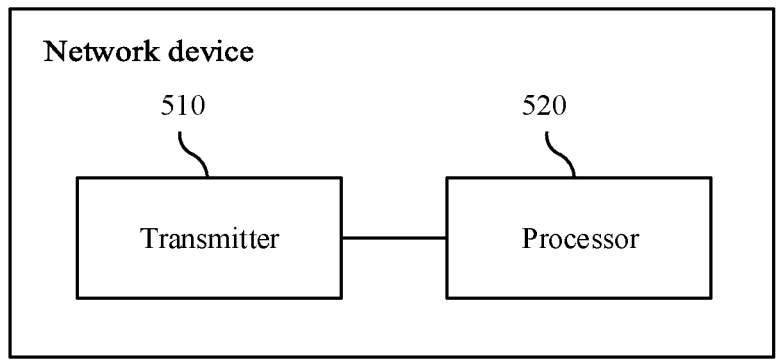
FIG. 6 is a structural diagram of another embodiment of a network device according to this application.

FIG. 6 shows another embodiment of a terminal device according to this application. The terminal device includes a transmitter 510 and a processor 520.

The processor 520 is configured to determine at least one basic resource element.

The processor 520 is further configured to determine at least one pilot configuration for each of the at least one basic resource element.

The transmitter 510 is configured to indicate, under control of the processor 520 to a first terminal device, at least one resource location of the at least one basic resource element and at least one pilot configuration for the at least one basic resource element.

The processor 520 is further configured to control the transmitter 510.

Optionally, the processor 520 is further configured to determine one or more basic resource elements. The processor 520 is further configured to determine at least one pilot configuration for each of the one or more basic resource elements. The transmitter 510 is further configured to indicate, under control of the processor 520 to a second terminal device, one or more resource locations of the one or more basic resource elements and at least one pilot configuration for the one or more basic resource elements. The at least one basic resource element and the one or more basic resource elements each include a first basic resource element. The at least one pilot configuration for the at least one basic resource element includes at least one first pilot configuration, and the at least one first pilot configuration is determined for the first basic resource element. The at least one pilot configuration for the one or more basic resource elements includes at least one second pilot configuration, and the at least one second pilot configuration is determined for the first basic resource element. Each first pilot configuration is different from each second pilot configuration.

Optionally, the processor 520 is further configured to determine at least one resource element group, where each resource element group includes at least one resource element, and each resource element includes one or more of the at least one basic resource element. The transmitter 510 is further configured to indicate, under control of the processor 520 to the first terminal device, one or more resource locations of the at least one resource element group.

Optionally, the transmitter 510 is further configured to indicate, under control of the processor 520 to the first terminal device, one or more resource locations of the at least one resource element in each resource element group.

Optionally, the transmitter 510 is further configured to indicate, under control of the processor 520 to the first terminal device, one or more resource locations of each resource element group. The transmitter 510 is further configured to indicate, under control of the processor 520 to the first terminal device, a location of each resource element in a resource element group to which the resource element belongs. Alternatively, the processor 520 is further configured to determine, according to a predefined rule, at least one location of the at least one resource element in a resource element group to which the at least one resource element belongs.

Optionally, the transmitter 510 is further configured to indicate, under control of the processor 520 to the first terminal device, a quantity of basic resource elements included in the at least one resource element in each resource element group.

Optionally, each resource element group corresponds to a transmission parameter.

Optionally, the transmitter 510 is further configured to indicate, under control of the processor 520 to the first terminal device, a correspondence between each resource element group and a transmission parameter.

Optionally, the transmitter 510 is further configured to indicate, under control of the processor 520 to the first terminal device, a quantity of minimum scheduling units included in the basic resource element.

Optionally, the at least one basic resource element is at least two basic resource elements.

Optionally, the transmission parameter includes at least one of a transport block size and an MCS level.

For detailed descriptions of technical details and beneficial effects in this embodiment, refer to the foregoing method embodiment.

Figure 7:
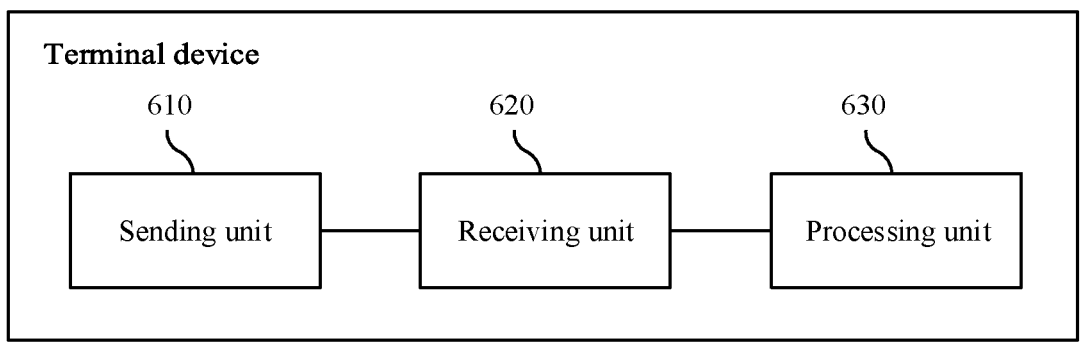
FIG. 7 is a structural diagram of an embodiment of a terminal device according to this application.

FIG. 7 shows an embodiment of a network device according to this application. The network device includes a sending unit 610, a receiving unit 620, and a processing unit 630.

The receiving unit 620 is configured to learn, from a network device, of at least one resource location of at least one basic resource element and at least one pilot configuration for the at least one basic resource element, where each basic resource element corresponds to at least one pilot configuration.

The processing unit 630 is configured to determine a transmission resource based on one or more resource locations of one or more of the at least one basic resource element.

The processing unit 630 is further configured to generate at least one pilot for the one or more basic resource elements based on at least one pilot configuration for the one or more basic resource elements.

The sending unit 610 is configured to send data by occupying the transmission resource and based on the at least one pilot for the one or more basic resource elements.

Optionally, the receiving unit 620 is further configured to learn, from the network device, of at least one resource location of at least one resource element group. The processing unit 630 is further configured to determine the transmission resource based on one or more resource locations of at least one resource element in a first resource element group in the at least one resource element group. The processing unit 630 is further configured to determine at least one pilot for at least one basic resource element in the first resource element group based on at least one pilot configuration for the at least one basic resource element in the first resource element group. The sending unit 610 is further configured to send data by occupying the transmission resource and based on the at least one pilot for the at least one basic resource element in the first resource element group. Each resource element group includes at least one resource element, each resource element includes at least one basic resource element, and a same transport block is carried by one resource element.

Optionally, the receiving unit 620 is further configured to learn, from the network device, of one or more resource locations of the at least one resource element in each resource element group.

Optionally, the receiving unit 620 is further configured to learn, from the network device, of one or more resource locations of each resource element group. The receiving unit 620 is further configured to learn, from the network device, of a location of each resource element in a resource element group to which the resource element belongs. Alternatively, the processing unit 630 is further configured to determine, according to a predefined rule, at least one location of the at least one resource element in a resource element group to which the at least one resource element belongs.

Optionally, the receiving unit 620 is further configured to learn, from the network device, of a quantity of basic resource elements included in the at least one resource element in each resource element group.

Optionally, each resource element group corresponds to a transmission parameter.

Optionally, the receiving unit 620 is further configured to receive, from the network device, a correspondence between each of the at least one resource element group and a transmission parameter.

Optionally, the receiving unit 620 is further configured to learn, from the network device, of a quantity of minimum scheduling units included in the basic resource element.

Optionally, the at least one basic resource element is at least two basic resource elements.

Optionally, the transmission parameter includes at least one of a transport block size and an MCS level.

For detailed descriptions of technical details and beneficial effects in this embodiment, refer to the foregoing method embodiment.

Figure 8:
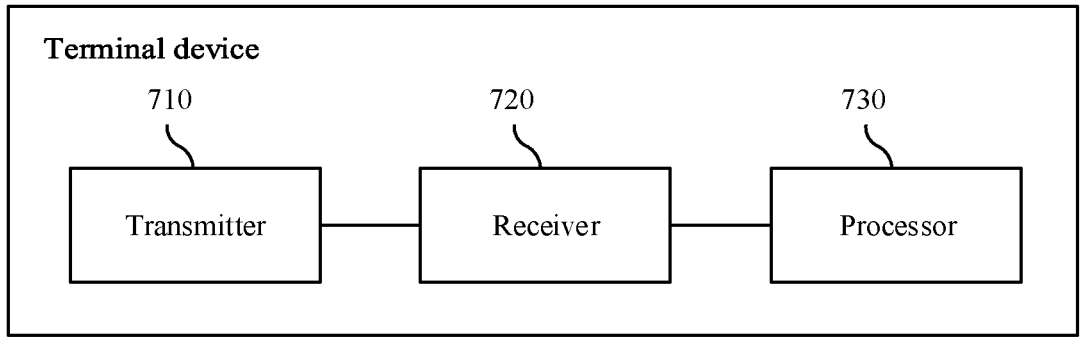
FIG. 8 is a structural diagram of another embodiment of a terminal device according to this application.

FIG. 8 shows another embodiment of a network device according to this application. The network device includes a transmitter 710, a receiver 720, and a processor 730.

The receiver 720 is configured to learn, under control of the processor 730 from a network device, of at least one resource location of at least one basic resource element and at least one pilot configuration for the at least one basic resource element, where each basic resource element corresponds to at least one pilot configuration.

The processor 730 is configured to determine a transmission resource based on one or more resource locations of one or more of the at least one basic resource element.

The processor 730 is further configured to generate at least one pilot for the one or more basic resource elements based on at least one pilot configuration for the one or more basic resource elements.

The transmitter 710 is configured to send, under control of the processor 730, data by occupying the transmission resource and based on the at least one pilot for the one or more basic resource elements.

The processor 730 is further configured to control the transmitter 710 and the receiver 720.

Optionally, the receiver 720 is further configured to learn, under control of the processor 730 from the network device, of at least one resource location of at least one resource element group. The processor 730 is further configured to determine the transmission resource based on one or more resource locations of at least one resource element in a first resource element group in the at least one resource element group. The processor 730 is further configured to determine at least one pilot for at least one basic resource element in the first resource element group based on at least one pilot configuration for the at least one basic resource element in the first resource element group. The transmitter 710 is further configured to send, under control of the processor 730, data by occupying the transmission resource and based on the at least one pilot for the at least one basic resource element in the first resource element group. Each resource element group includes at least one resource element, each resource element includes at least one basic resource element, and a same transport block is carried by one resource element.

Optionally, the receiver 720 is further configured to learn, under control of the processor 730 from the network device, of one or more resource locations of the at least one resource element in each resource element group.

Optionally, the receiver 720 is further configured to learn, under control of the processor 730 from the network device, of one or more resource locations of each resource element group. The receiving unit 720 is further configured to learn, from the network device, of a location of each resource element in a resource element group to which the resource element belongs. Alternatively, the processing unit 730 is further configured to determine, according to a predefined rule, at least one location of the at least one resource element in a resource element group to which the at least one resource element belongs.

Optionally, the receiver 720 is further configured to learn, under control of the processor 730 from the network device, of a quantity of basic resource elements included in the at least one resource element in each resource element group.

Optionally, each resource element group corresponds to a transmission parameter.

Optionally, the receiver 720 is further configured to receive, under control of the processor 730 from the network device, a correspondence between each of the at least one resource element group and a transmission parameter.

Optionally, the receiver 720 is further configured to learn, under control of the processor 730 from the network device, of a quantity of minimum scheduling units included in the basic resource element.

Optionally, the at least one basic resource element is at least two basic resource elements.

Optionally, the transmission parameter includes at least one of a transport block size and an MCS level.

For detailed descriptions of technical details and beneficial effects in this embodiment, refer to the foregoing method embodiment.

Figure 9:
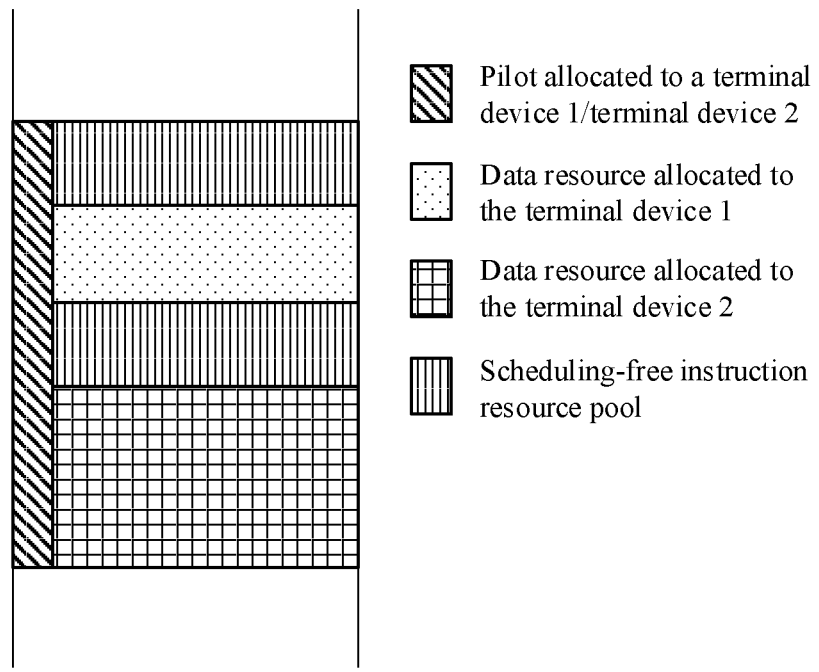
FIG. 9 is a schematic diagram of a channel structure according to this application.

Referring to FIG. 9, a channel structure provided in this application includes pilot resources and data resources. The data resources include data resources and a scheduling-free resource pool that are allocated to terminal devices. A longitudinal direction indicates a frequency domain resource of the channel structure, and a transverse direction indicates a time domain resource of the channel structure.

Figure 12:
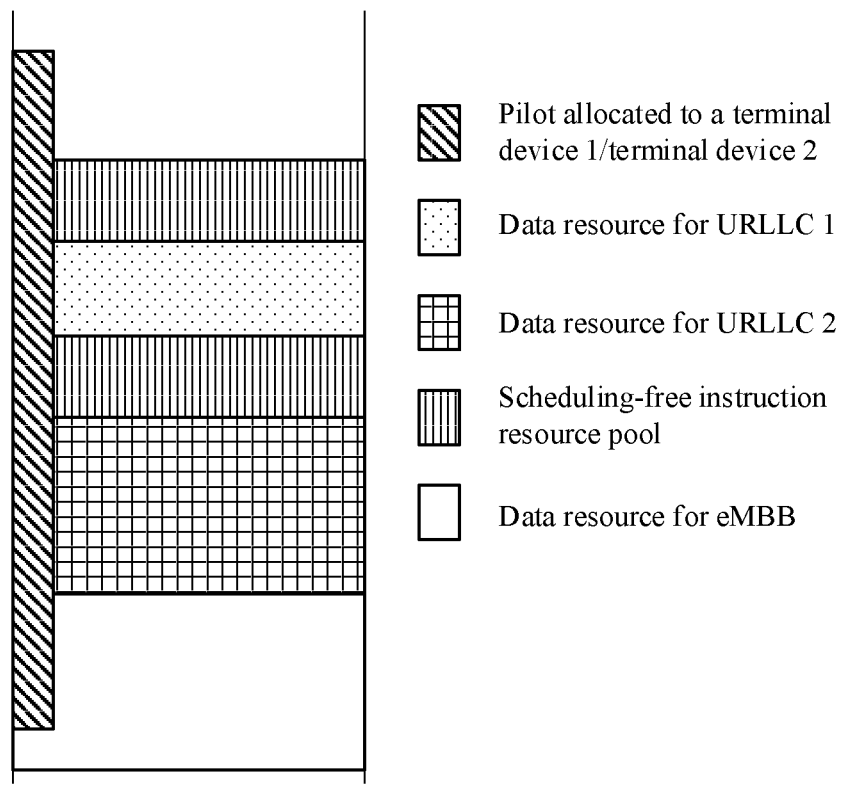
FIG. 12 is a schematic diagram of yet another channel structure according to this application.

Herein, a frequency domain width of a pilot resource is unrelated to a frequency domain width of a data transmission resource. The network device separately configures a width of a frequency domain occupied by a pilot, and pilots of different terminal devices share a same time-frequency resource. In an example, the width of the frequency domain occupied by the pilot may be the same as a frequency domain width of a data resource, or may be greater than a frequency domain width of a data resource (as shown in FIG. 12). The width of the frequency domain occupied by the pilot may be the same as a frequency domain width of the resource pool (grant free), or may be greater than a frequency domain width of a scheduling-free instruction resource. In this case, a relatively wide pilot in frequency domain supports orthogonality of more users, and a relatively narrow data resource or resource pool in frequency domain avoids resource waste.

Figure 11:
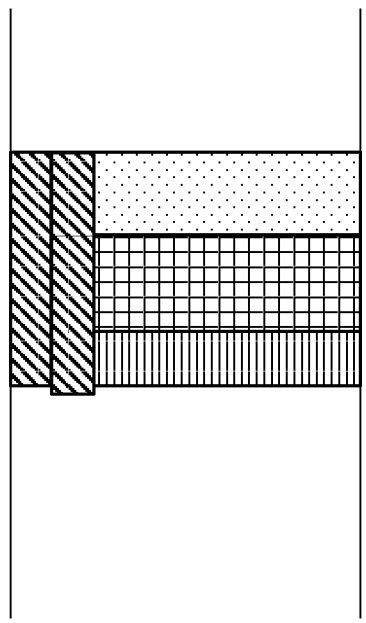
FIG. 11 is a schematic diagram of still another channel structure according to this application.

In an example, the network device may further configure a time domain width of a pilot (as shown in FIG. 11). When a width of a frequency domain occupied by a pilot is relatively small, a quantity of orthogonal users may be increased by extending a pilot resource (CDM and TDM) in time domain. In an example, when a pilot occupies a plurality of symbols, the pilot occupies a plurality of consecutive symbols.

Figure 10:
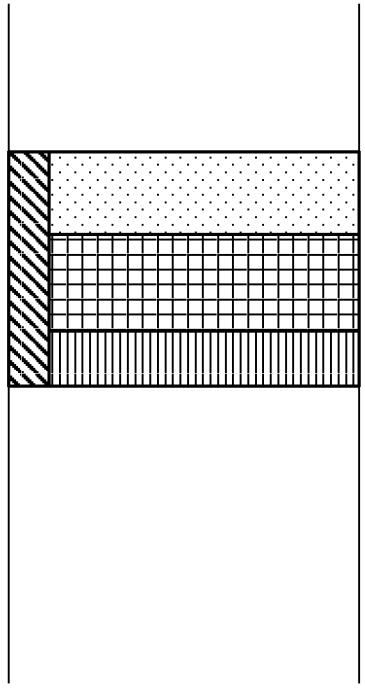
FIG. 10 is a schematic diagram of another channel structure according to this application.

In an example, different pilot resources and/or resource pools may be configured for edge users (for example, a terminal device 3 and a terminal device 4 in FIG. 10) and center users (for example, a terminal device 1 and a terminal device 2 in FIG. 9). For example, a relatively narrow pilot resource and scheduling-free instruction resource pool in frequency domain may be configured for the edge users In an example, the network device may semi-statically configure a size of the transmission resource and an agreed frequency domain start location. Alternatively, the network device may semi-statically configure a size of the transmission resource, and a frequency domain start location of each transmission resource is agreed according to a predefined rule. For example, the start location of the transmission resource may be determined according to a frequency hopping rule. In this case, a frequency hopping parameter includes at least Tbsize/Tbtype, and the frequency domain start location of the transmission resource may be determined according to Freq_position=f(t, Tbtype). The network device may further make a start location of the transmission resource correspond to a pilot resource. For example, the network device may configure pilot resources 1 and 2 for a terminal device. The pilot resource 1 indicates start locations 1, 3, and 5 of the transmission resource, and the pilot resource 2 indicates start locations 2 and 4 of the transmission resource.

In an example, a pilot resource includes a pilot sequence, a pilot pattern, and a time/frequency domain resource. One symbol or two symbols may be configured for the pilot resource.

In an example, the terminal device may map the data transmission resource according to a predefined rule, or may randomly select the data transmission resource.

A person of ordinary skill in the art may understand that all or some of the steps of the embodiments may be implemented by hardware or a program instructing related hardware. The program may be stored in a computer readable storage medium. The foregoing storage medium may be a read-only memory, a magnetic disk, an optical disc, or the like.

The foregoing descriptions are merely examples of this application, but are not intended to limit this application. Any modification, equivalent replacement, or improvement made without departing from the spirit and principle of this application shall fall within the protection scope of this application

What is claimed is:

1. A method comprising:
learning, by a first device from a network device, of a resource location of a basic resource element and a pilot configuration corresponding to the basic resource element;
determining, by the first device, a transmission resource according to the resource location of the basic resource element;
generating, by the first device, a pilot for the basic resource element according to the pilot configuration corresponding to the basic resource element; and
sending, by the first device, data by occupying the transmission resource and according to the pilot generated for the basic resource element,
wherein the pilot configuration is based on the following pilot sequence:

$$RS1: x_q(m) = e^{j\alpha 1 m} e^{-j\frac{\pi q m(m+1)}{N_{ZC}^{RS}}}, 0 \leq m \leq N_{ZC}^{RS} - 1;$$

$$RS2: x_q(m) = e^{j\alpha 2 m} e^{-j\frac{\pi q m(m+1)}{N_{ZC}^{RS}}}, 0 \leq m \leq N_{ZC}^{RS} - 1; \text{ and}$$

$$RS3: x_q(m) = e^{j\alpha 3 m} e^{-j\frac{\pi q m(m+1)}{N_{ZC}^{RS}}}, 0 \leq m \leq N_{ZC}^{RS} - 1; \text{ or}$$

$$RS1: x_{q1}(m) = e^{j\alpha 1 m} e^{-j\frac{\pi q 1 m(m+1)}{N_{ZC}^{RS}}}, 0 \leq m \leq N_{ZC}^{RS} - 1;$$

$$RS2: x_{q2}(m) = e^{j\alpha 2 m} e^{-j\frac{\pi q 2 m(m+1)}{N_{ZC}^{RS}}}, 0 \leq m \leq N_{ZC}^{RS} - 1; \text{ and}$$

$$RS3: x_{q3}(m) = e^{j\alpha 3 m} e^{-j\frac{\pi q 3 m(m+1)}{N_{ZC}^{RS}}}, 0 \leq m \leq N_{ZC}^{RS} - 1; \text{ or}$$

$$RS1: x_{q1}(m) = e^{j\alpha m} e^{-j\frac{\pi q 1 m(m+1)}{N_{ZC}^{RS}}}, 0 \leq m \leq N_{ZC}^{RS} - 1;$$

$$RS2: x_{q2}(m) = e^{j\alpha m} e^{-j\frac{\pi q 2 m(m+1)}{N_{ZC}^{RS}}}, 0 \leq m \leq N_{ZC}^{RS} - 1; \text{ and}$$

$$RS3: x_{q3}(m) = e^{j\alpha m} e^{-j\frac{\pi q 3 m(m+1)}{N_{ZC}^{RS}}}, 0 \leq m \leq N_{ZC}^{RS} - 1,$$

and
wherein $N_{ZC}^{RS}$ is a length of a Zadoff-Chu sequence.

2. The method according to claim 1,
wherein learning, from the network device, of the resource location of the basic resource element comprises learning, from the network device, of a resource location of a resource element group;
determining the transmission resource according to the resource location of the basic resource element comprises determining the transmission resource according to the resource location of a resource element in the resource element group;
determining the pilot for the basic resource element according to the pilot configuration corresponding to the basic resource element comprises determining the pilot for the basic resource element in the resource element group according to the pilot configuration corresponding to the basic resource element in the resource element group; and
sending the data by occupying the transmission resource and according to the pilot generated for the basic resource element comprises sending the data by occupying the transmission resource and according to the pilot for the basic resource element in the resource element group, wherein the resource element comprises the basic resource element, and a same transport block is carried by the resource element.

3. The method according to claim 2, wherein learning, from the network device, of the resource location of the resource element group comprises:
learning, from the network device, of a respective resource location of a respective resource element in each of a plurality of resource element groups, wherein the plurality of resource element groups comprises the resource element group.

4. An apparatus comprising:
a storage medium including executable instructions; and
a processor, wherein the executable instructions, when executed by the processor, cause the apparatus to:
determine a first basic resource element;
determine a first pilot configuration for the first basic resource element; and
indicate, to a first terminal device, a first resource location of the first basic resource element and the first pilot configuration for the first basic resource element;
determine a second basic resource element;
determine a second pilot configuration for the second basic resource element; and
indicate, to a second terminal device, a second resource location of the second basic resource element and the second pilot configuration for the second basic resource element,
wherein the first basic resource element and the second basic resource elements each comprise a third basic resource element,
wherein the first pilot configuration for the first basic resource element comprises a third pilot configuration corresponding to the third basic resource element,
wherein the second pilot configuration for the second basic resource element comprises a fourth pilot configuration corresponding to the third basic resource element, and
wherein the third pilot configuration is different from the fourth pilot configuration.

5. The apparatus according to claim 4, wherein the executable instructions, when executed by the processor, further cause the apparatus to:
determine a resource element group comprising a resource element, and the resource element comprises the first basic resource element; and
indicate, to the first terminal device, a resource location of the resource element group.

6. The apparatus according to claim 5, wherein the executable instructions, when executed by the processor, further cause the apparatus to:
indicate, to the first terminal device, a respective resource location of a respective resource element in each of a plurality of resource element groups, the plurality of resource element groups comprise the resource element group.

7. The apparatus according to claim 5, wherein the executable instructions, when executed by the processor, further cause the apparatus to:
indicate, to the first terminal device, a respective resource location of each of a plurality of resource element groups, the plurality of resource element groups comprise the resource element group; and
indicate, to the first terminal device, a respective location of each resource element in a respective one of the plurality of resource element groups to which the respective resource element belongs, or
wherein the processor is further configured to:
determine, according to a predefined rule, a location of the resource element in the resource element group.

8. The apparatus according to claim 5, wherein the executable instructions, when executed by the processor, further cause the apparatus to:
indicate, to the first terminal device, a quantity of basic resource elements comprised in the resource element in the resource element group.

9. The apparatus according to claim 5, wherein the resource element group corresponds to a transmission parameter.

10. The apparatus according to claim 9, wherein the executable instructions, when executed by the processor, further cause the apparatus to:
indicate, to the first terminal device, a correspondence between the resource element group and the transmission parameter.

11. The apparatus according to claim 4, wherein the executable instructions, when executed by the processor, further cause the apparatus to:
indicate, to the first terminal device, a quantity of minimum scheduling units comprised in the first basic resource element.

12. An apparatus comprising:
a storage medium including executable instructions; and
a processor, wherein the executable instructions, when executed by the processor, cause the apparatus to:
learn, from a network device, of a resource location of a basic resource element and a pilot configuration corresponding to the basic resource element;
determine a transmission resource according to the resource location of the basic resource element;
generate a pilot for the basic resource element according to the pilot configuration corresponding to the basic resource element; and
send data by occupying the transmission resource and according to the pilot generated for the basic resource element,
wherein the pilot configuration is based on the following pilot sequence:

$$RS1: x_q(m) = e^{j\alpha 1 m} e^{-j\frac{\pi q m(m+1)}{N_{ZC}^{RS}}}, \ 0 \le m \le N_{ZC}^{RS} - 1;$$

$$RS2: x_q(m) = e^{j\alpha 2 m} e^{-j\frac{\pi q m(m+1)}{N_{ZC}^{RS}}}, \ 0 \le m \le N_{ZC}^{RS} - 1; \text{ and}$$

$$RS3: x_q(m) = e^{j\alpha 3 m} e^{-j\frac{\pi q m(m+1)}{N_{ZC}^{RS}}}, \ 0 \le m \le N_{ZC}^{RS} - 1; \text{ or}$$

$$RS1: x_{q1}(m) = e^{j\alpha 1 m} e^{-j\frac{\pi q 1 m(m+1)}{N_{ZC}^{RS}}}, \ 0 \le m \le N_{ZC}^{RS} - 1;$$

$$RS2: x_{q2}(m) = e^{j\alpha 2 m} e^{-j\frac{\pi q 2 m(m+1)}{N_{ZC}^{RS}}}, \ 0 \le m \le N_{ZC}^{RS} - 1; \text{ and}$$

$$RS3: x_{q3}(m) = e^{j\alpha 3 m} e^{-j\frac{\pi q 3 m(m+1)}{N_{ZC}^{RS}}}, \ 0 \le m \le N_{ZC}^{RS} - 1; \text{ or}$$

$$RS1: x_{q1}(m) = e^{j\alpha m} e^{-j\frac{\pi q 1 m(m+1)}{N_{ZC}^{RS}}}, \ 0 \le m \le N_{ZC}^{RS} - 1;$$

$$RS2: x_{q2}(m) = e^{j\alpha m} e^{-j\frac{\pi q 2 m(m+1)}{N_{ZC}^{RS}}}, \ 0 \le m \le N_{ZC}^{RS} - 1; \text{ and}$$

$$RS3: x_{q3}(m) = e^{j\alpha m} e^{-j\frac{\pi q 3 m(m+1)}{N_{ZC}^{RS}}}, \ 0 \le m \le N_{ZC}^{RS} - 1,$$

and
wherein $N_{ZC}^{RS}$ is a length of a Zadoff-Chu sequence.

13. The apparatus according to claim 12, wherein the executable instructions, when executed by the processor, further cause the apparatus to:
learn, from the network device, of a resource location of a resource element group;
determine the transmission resource according to the resource locations of a resource element in the resource element group;
determine the pilot for the basic resource element in the resource element group according to the pilot configuration corresponding to the basic resource element in the resource element group; and
send data by occupying the transmission resource and according to the pilot for the basic resource element in the resource element group,
wherein the resource element comprises the basic resource element, and a same transport block is carried by the resource element.

14. The apparatus according to claim 13, wherein the executable instructions, when executed by the processor, further cause the apparatus to:
learn, from the network device, of a respective resource location of a respective resource element in each of a plurality of resource element groups, wherein the plurality of resource element groups comprises the resource element group.

15. The apparatus according to claim 13, wherein the executable instructions, when executed by the processor, further cause the apparatus to:
learn, from the network device, of a respective resource location of each of a plurality of resource element groups, wherein the plurality of resource element groups comprises the resource element group; and
learn, from the network device, of a respective location of each resource element in a respective one of the plurality of resource element groups to which the resource element belongs; or
wherein the processor is further configured to determine, according to a predefined rule, a location of the resource element in the resource element group.

16. The apparatus according to claim 13, wherein the executable instructions, when executed by the processor, further cause the apparatus to:
learn, from the network device, of a quantity of basic resource elements comprised in the resource element in the resource element group.

17. The apparatus according to claim 13, wherein the resource element group corresponds to a transmission parameter.

18. The apparatus according to claim 17, wherein the executable instructions, when executed by the processor, further cause the apparatus to:

receive, from the network device, a correspondence between the resource element group and the transmission parameter.

19. The apparatus according to claim 12, wherein the executable instructions, when executed by the processor, further cause the apparatus to:

learn, from the network device, of a quantity of minimum scheduling units comprised in the basic resource element.

20. The apparatus according to claim 5, wherein the pilot configuration is based on the following pilot sequence:

$$RS1: x_q(m) = e^{j\alpha 1 m}e^{-j\frac{\pi qm(m+1)}{N_{ZC}^{RS}}}, 0 \le m \le N_{ZC}^{RS} - 1;$$

$$RS2: x_q(m) = e^{j\alpha 2 m}e^{-j\frac{\pi qm(m+1)}{N_{ZC}^{RS}}}, 0 \le m \le N_{ZC}^{RS} - 1; \text{ and}$$

$$RS3: x_q(m) = e^{j\alpha 3 m}e^{-j\frac{\pi qm(m+1)}{N_{ZC}^{RS}}}, 0 \le m \le N_{ZC}^{RS} - 1; \text{ or}$$

$$RS1: x_{q1}(m) = e^{j\alpha 1 m}e^{-j\frac{\pi q1m(m+1)}{N_{ZC}^{RS}}}, 0 \le m \le N_{ZC}^{RS} - 1;$$

$$RS2: x_{q2}(m) = e^{j\alpha 2 m}e^{-j\frac{\pi q2m(m+1)}{N_{ZC}^{RS}}}, 0 \le m \le N_{ZC}^{RS} - 1; \text{ and}$$

$$RS3: x_{q3}(m) = e^{j\alpha 3 m}e^{-j\frac{\pi q3m(m+1)}{N_{ZC}^{RS}}}, 0 \le m \le N_{ZC}^{RS} - 1; \text{ or}$$

$$RS1: x_{q1}(m) = e^{j\alpha m}e^{-j\frac{\pi q1m(m+1)}{N_{ZC}^{RS}}}, 0 \le m \le N_{ZC}^{RS} - 1;$$

$$RS2: x_{q2}(m) = e^{j\alpha m}e^{-j\frac{\pi q2m(m+1)}{N_{ZC}^{RS}}}, 0 \le m \le N_{ZC}^{RS} - 1; \text{ and}$$

$$RS3: x_{q3}(m) = e^{j\alpha m}e^{-j\frac{\pi q3m(m+1)}{N_{ZC}^{RS}}}, 0 \le m \le N_{ZC}^{RS} - 1,$$

and wherein $N_{ZC}^{RS}$ is a length of a Zadoff-Chu sequence.

* * * * *